(12) United States Patent
Torikai et al.

(10) Patent No.: US 9,848,225 B2
(45) Date of Patent: Dec. 19, 2017

(54) INFORMATION PROCESSING APPARATUS, CONTROL METHOD THEREFOR, AND PROGRAM

(71) Applicant: CANON KABUSHIKI KAISHA, Tokyo (JP)

(72) Inventors: Hiroyuki Torikai, Tokyo (JP); Koji Hatanaka, Yokohama (JP); Ayumi Suzuki, Kawasaki (JP); Shigeyuki Mitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/910,944

(22) PCT Filed: Aug. 11, 2014

(86) PCT No.: PCT/JP2014/071506
§ 371 (c)(1),
(2) Date: Feb. 8, 2016

(87) PCT Pub. No.: WO2015/022997
PCT Pub. Date: Feb. 19, 2015

(65) Prior Publication Data
US 2016/0198210 A1     Jul. 7, 2016

(30) Foreign Application Priority Data

Aug. 13, 2013 (JP) .................. 2013-168337
Aug. 13, 2013 (JP) .................. 2013-168338

(51) Int. Cl.
*H04N 21/2743* (2011.01)
*H04N 5/765* (2006.01)
(Continued)

(52) U.S. Cl.
CPC ....... *H04N 21/2743* (2013.01); *G06F 21/606* (2013.01); *H04N 5/765* (2013.01);
(Continued)

(58) Field of Classification Search
CPC ............... H04N 21/2743; H04N 5/765; H04N 21/2187; H04N 21/4334; H04N 21/632;
(Continued)

(56) References Cited

U.S. PATENT DOCUMENTS

2012/0151006 A1   6/2012   McInerney et al.
2012/0278444 A1   11/2012  Ohkita

FOREIGN PATENT DOCUMENTS

CA   28166211 A1   5/2012
EP   0837579 A2   4/1998
(Continued)

OTHER PUBLICATIONS

JP 2013-97410 Translation.*
The references 2-5 and 7-10 were cited the International Search Report of International Application No. PCT/JP2014/071506 dated Aug. 11, 2014.
(Continued)

*Primary Examiner* — Twyler Haskins
*Assistant Examiner* — Angel L Garces-Rivera
(74) *Attorney, Agent, or Firm* — Cowan, Liebowitz & Latman, P.C.

(57) ABSTRACT

Data reception via an appropriate route is realized on an information processing apparatus that can receive data from a communication apparatus via one of a plurality of different routes, and in a control method therefor. If a first device has been discovered on a first network, data is received from the first device on the first network. If the data received from the first device on the first network is to be transferred from a second device existing on a second network, the data is uploaded onto the second device. At this time, whether or not data received by the first reception unit is to be transferred from the second device is determined in accordance with a setting at the time of the discovery of the first device.

15 Claims, 18 Drawing Sheets

(51) Int. Cl.
*H04N 21/2187* (2011.01)
*H04N 21/433* (2011.01)
*H04N 21/63* (2011.01)
*G06F 21/60* (2013.01)
*H04N 21/436* (2011.01)
*H04N 21/4363* (2011.01)
*H04N 5/232* (2006.01)

(52) U.S. Cl.
CPC ..... *H04N 21/2187* (2013.01); *H04N 21/4334* (2013.01); *H04N 21/43615* (2013.01); *H04N 21/43637* (2013.01); *H04N 21/632* (2013.01); *G06F 2221/2143* (2013.01); *H04N 5/232* (2013.01)

(58) Field of Classification Search
CPC ...... H04N 5/232; H04N 1/00; H04N 1/00127; H04N 1/00132; G06F 21/606; G06F 2221/2143
See application file for complete search history.

(56) References Cited

FOREIGN PATENT DOCUMENTS

| | | |
|---|---|---|
| JP | 2003-319309 A | 11/2003 |
| JP | 2005-229597 A | 8/2005 |
| JP | 2007-036911 A | 2/2007 |
| JP | 2008-021293 A | 1/2008 |
| JP | 2009-087040 A | 4/2009 |
| JP | 2011-525649 A | 9/2011 |
| JP | 2012-090150 A | 5/2012 |
| JP | 2012-238971 A | 12/2012 |
| JP | 2013-097410 A | 5/2013 |
| WO | 2010/002497 A1 | 1/2010 |
| WO | 2012/127803 A1 | 9/2012 |

OTHER PUBLICATIONS

The above documents were cited in a European Search Report dated Feb. 27, 2017, that issued in the corresponding European Patent Application No. 14836114.0.

* cited by examiner

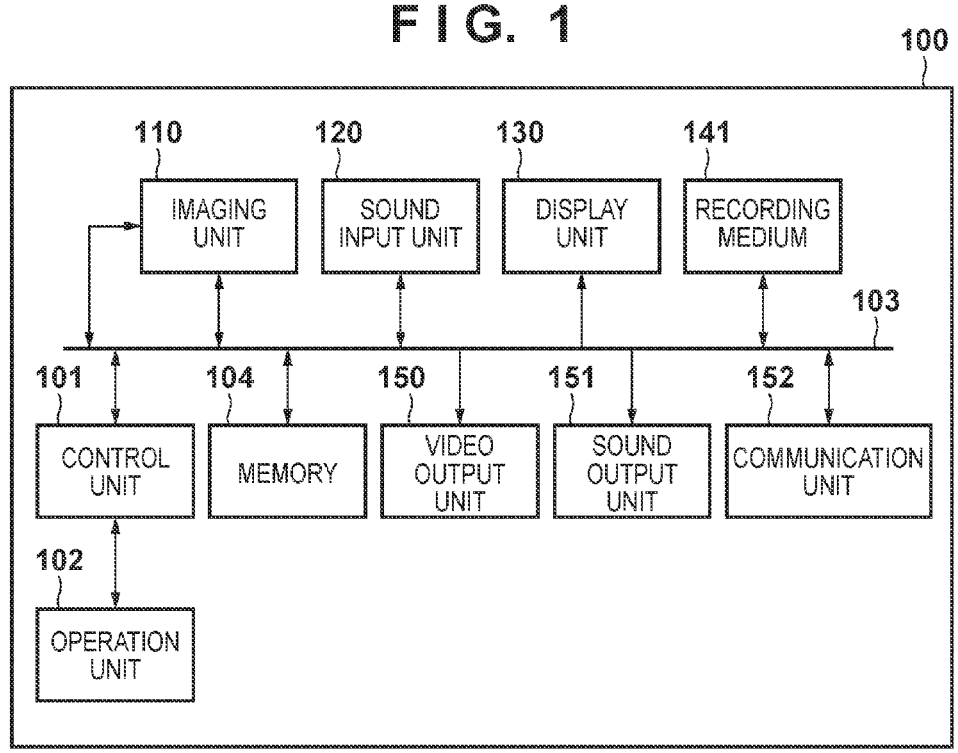
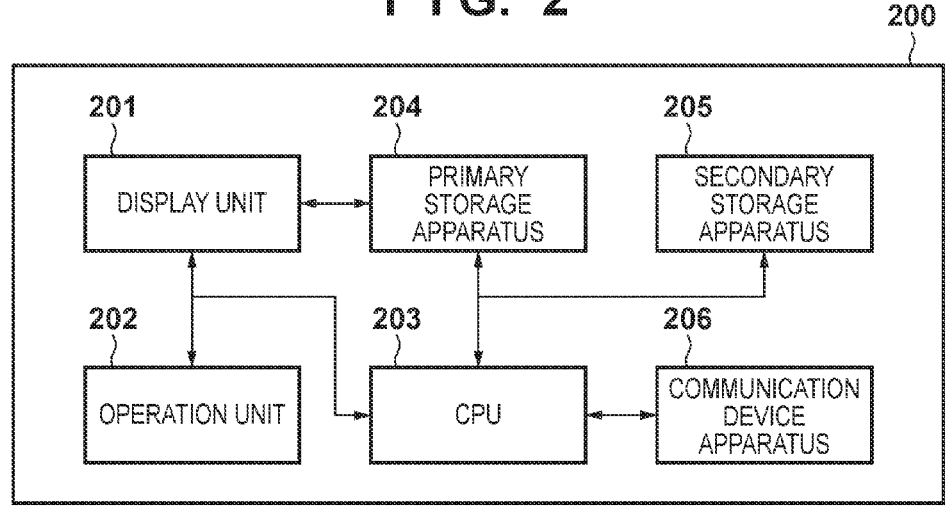

F I G. 4A

PAIRING INFORMATION (CAMERA-SERVER) 401

| ITEM | VALUE |
|---|---|
| Camera Name | Camera |
| Camera GUID | 12345678-1234-1234-1234-123456789ABC |
| Camera Alias ID | abcdefghijklmnopqrstuvwxyz0123456 |
| Access ID | abcdefg |
| Access Password | accesskeyword |

F I G. 4B

PAIRING INFORMATION (PC-SERVER) 402

| ITEM | VALUE |
|---|---|
| PC Name | Computer |
| PC GUID | 12345678-1234-1234-1234-123456789XYZ |
| PC Alias ID | abcdefghijklmnopqrstuvwxyz9876543 |
| Access ID | vwxyz |
| Access Password | accesskeyword |

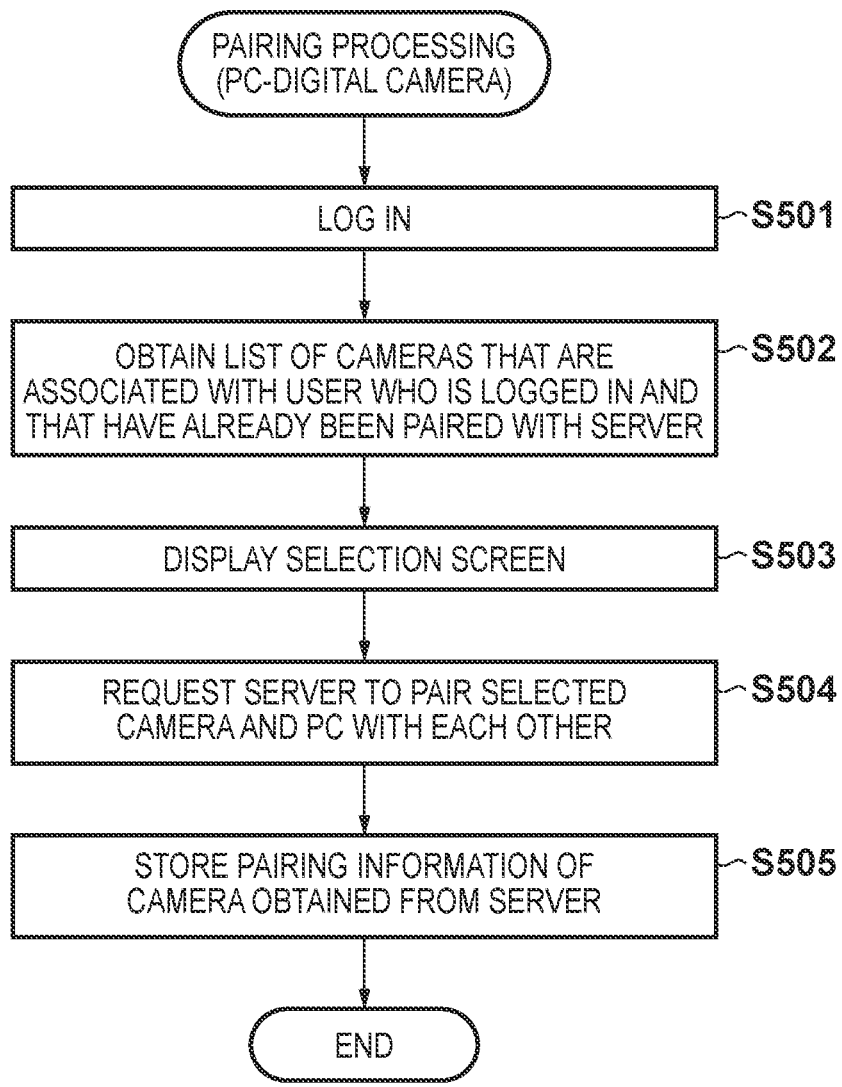

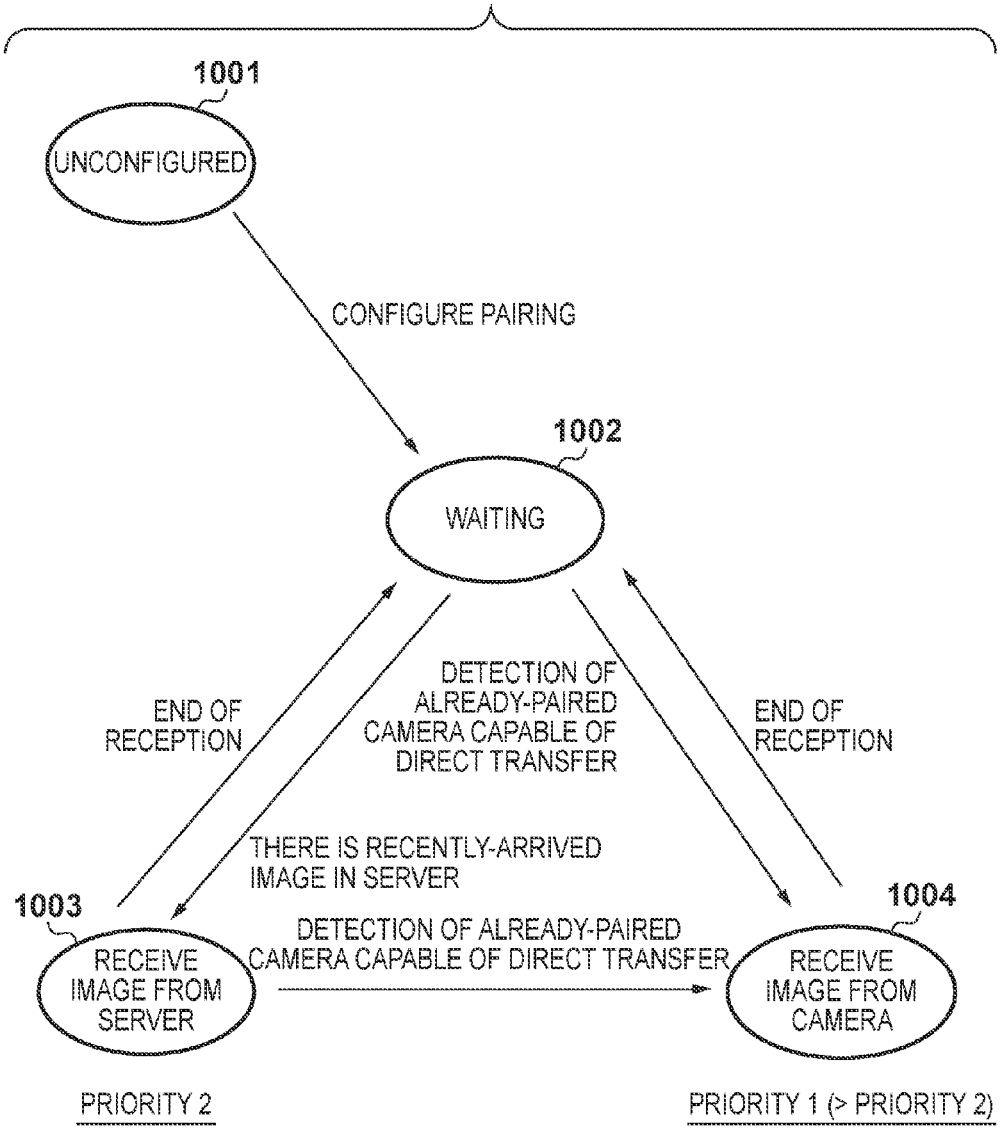

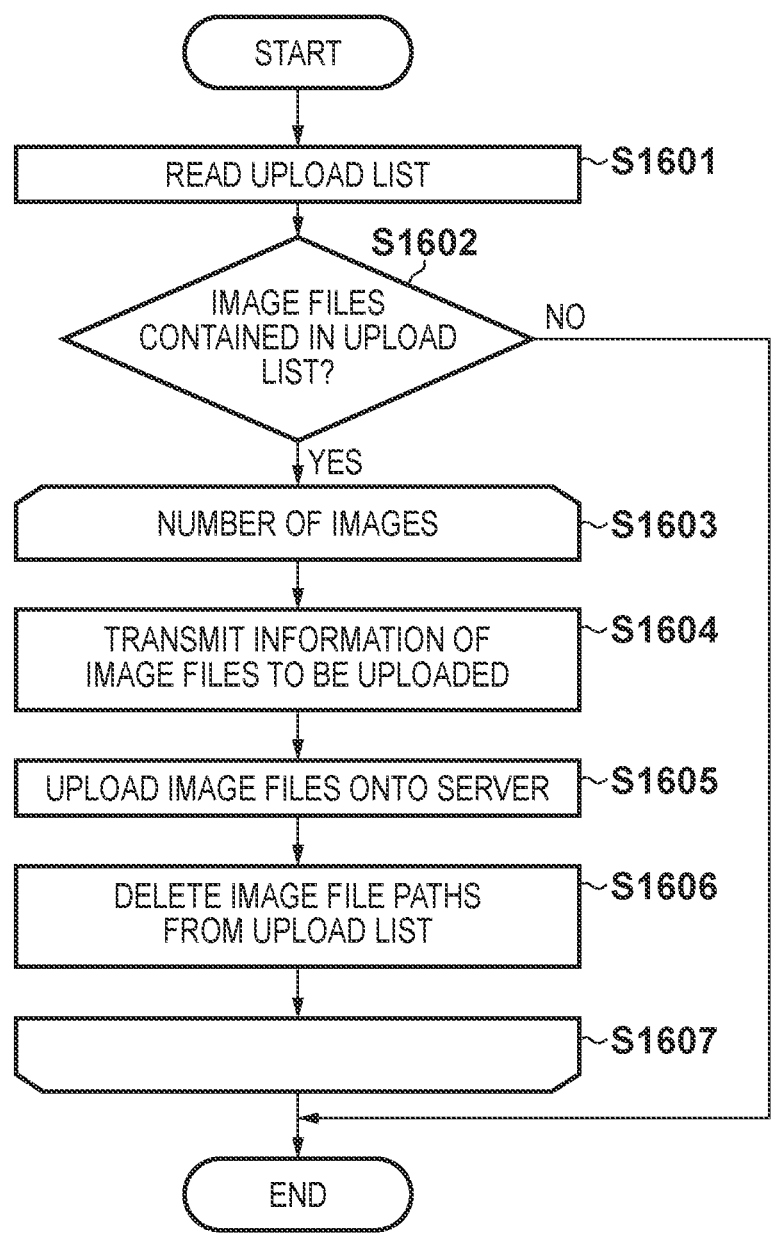

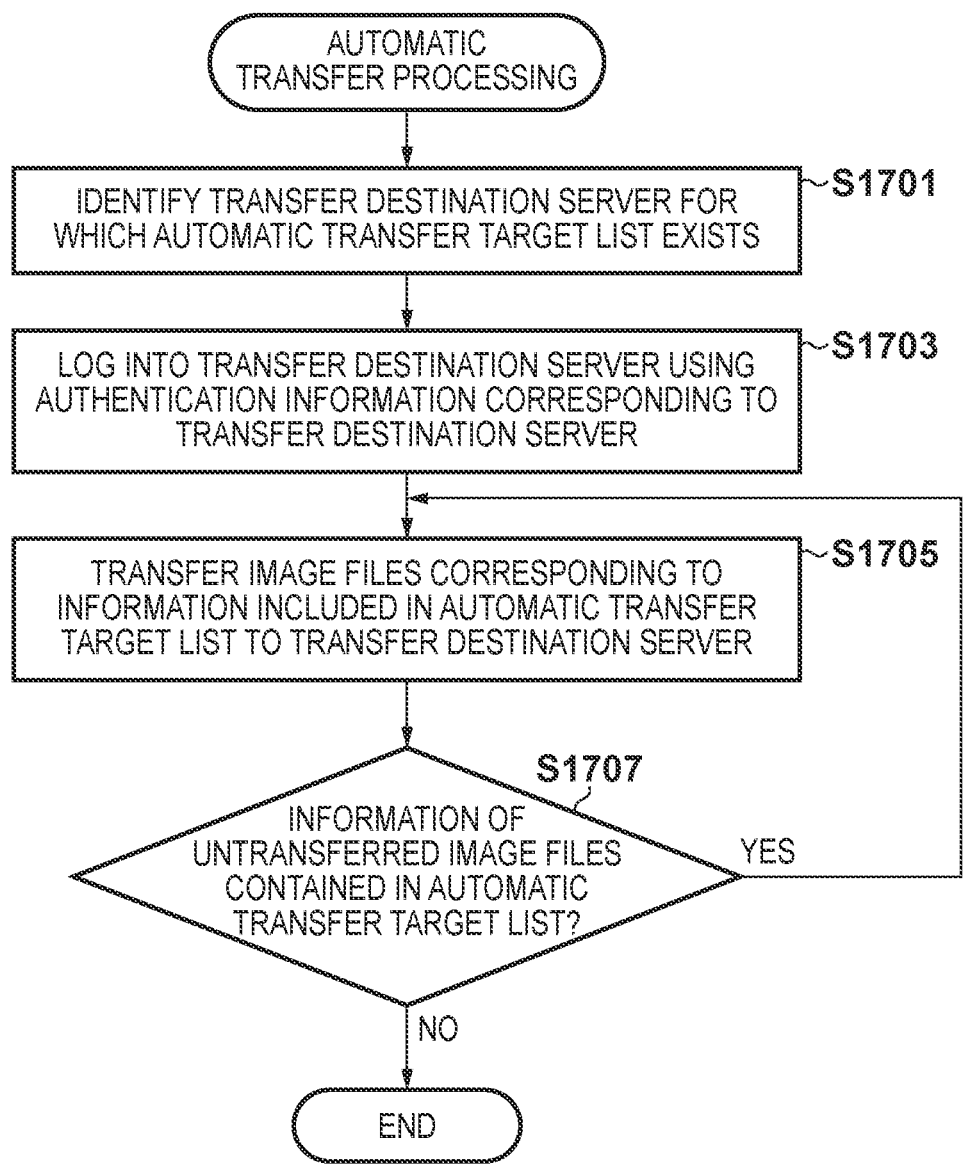

F I G. 18

| STATUS | IMAGE FILE |
|---|---|
| | LIST OF IMAGES TARGETED FOR UPLOAD |
| TRANSMITTED | C:¥Users¥Taro¥Pictures¥IMG_2365.JPG |
| TRANSMITTED | C:¥Users¥Taro¥Pictures¥IMG_2366.JPG |
| TRANSMITTED | C:¥Users¥Taro¥Pictures¥IMG_2367.JPG |
| UNKNOWN | C:¥Users¥Taro¥Pictures¥IMG_2370.JPG |
| TRANSMITTED | C:¥Users¥Taro¥Pictures¥IMG_2372.JPG |
| UNTRANSMITTED | C:¥Users¥Taro¥Pictures¥IMG_2373.JPG |
| UNTRANSMITTED | C:¥Users¥Taro¥Pictures¥IMG_2375.JPG |
| UNTRANSMITTED | C:¥Users¥Taro¥Pictures¥IMG_2378.JPG |
| UNTRANSMITTED | C:¥Users¥Taro¥Pictures¥IMG_2379.JPG |

INFORMATION PROCESSING APPARATUS, CONTROL METHOD THEREFOR, AND PROGRAM

CROSS-REFERENCE TO RELATED APPLICATIONS

This application is a national phase of International Application No. PCT/JP2014/071506 filed on Aug. 11, 2014, the entire disclosure of which is hereby incorporated by reference.

TECHNICAL FIELD

The present invention relates to an information processing apparatus, a control method therefor, and a program.

BACKGROUND ART

Digital cameras and digital video cameras equipped with a wireless communication function are known (Japanese Patent Laid-Open No. 2003-319309). Such digital cameras and digital video cameras can connect to a network using the wireless communication function, and upload captured image data onto a server on the network.

The image data uploaded onto the server is stored into a network storage via the server in such a manner that the image data can be browsed and shared by a user who can access the network storage. The image data can also be transferred from the server to, for example, a PC of the user, and backed up in the PC.

Transfer from the server to the PC of the user can be automated by, for example, installing an application dedicated to a data transfer service (a transfer service application) in the PC of the user. The transfer service application can be configured to, for example, query the server about whether or not there is recently arrived image data at regular intervals in an activated state, and issues a download request to the server if there is recently arrived image data.

Meanwhile, a PC that has a wireless communication function or is connectable to a wireless network is also known. Therefore, digital cameras and digital video cameras with a wireless communication function can also transfer image data to a PC with which they can communicate directly without passing through a server.

In this way, in the case of data transfer from an apparatus with a communication function (a communication apparatus) to an external apparatus via a network, the data transfer may be performed via either a route that passes through another network on which a server and the like exist, or a route that does not pass through another network. That is to say, from a standpoint of the external apparatus serving as a transfer destination, image data may be delivered from the same communication apparatus either via a server, or directly from the communication apparatus.

In such an environment, a transfer service application that runs on the external apparatus needs to appropriately treat data delivered via two routes. For example, if a data transfer service is provided only to a specific user or only to a pre-associated communication apparatus, it is necessary to determine whether or not to accept a request from a communication apparatus for communication that does not pass through a server. In another example, it is necessary to examine whether or not there is a communication apparatus that can directly transfer image data at regular intervals, in addition to whether or not there is recently arrived image data in a server. In still another example, in a case where transfer from one server to another server can be configured, it is necessary to upload received data onto the server if the server is intended to transfer the received data.

SUMMARY OF INVENTION

The present invention has been made in view of the above conventional problems, and one of objects thereof is to realize appropriate data processing commensurate with a reception route on an information processing apparatus that can receive data from a communication apparatus via one of a plurality of different routes, and in a control method therefor.

According to an aspect of the present invention, there is provided an information processing apparatus communicable with a device on a first network and with a device on a second network different from the first network, the information processing apparatus comprising: search means for searching for a first device on the first network; first reception means for, if the first device has been discovered by the search means, receiving data from the first device on the first network; and transmission means for, if the data received by the first reception means is to be transferred from a second device existing on the second network, uploading the data onto the second device, wherein the transmission means determines whether or not the data received by the first reception means is to be transferred from the second device in accordance with a setting at a time of the discovery of the first device.

According to another aspect of the present invention, there is provided a control method for an information processing apparatus communicable with a device on a first network and with a device on a second network different from the first network, the control method comprising: a search step of searching for a first device on the first network; a first reception step of, if the first device has been discovered in the search step, receiving data from the first device on the first network; and a transmission step of, if the data received in the first reception step is to be transferred from a second device existing on the second network, uploading the data onto the second device, wherein, in the transmission step, whether or not the data received in the first reception step is to be transferred from the second device is determined in accordance with settings at a time of the discovery of the first device.

According to an aspect of the present invention, there is provided an information processing apparatus communicable with a device on a first network and with a device on a second network different from the first network, the information processing apparatus comprising: search means for searching for a first device on the first network; first reception means for, if the first device has been discovered by the search means, receiving data from the first device on the first network; confirmation means for confirming whether or not a second device existing on the second network has data that has been transmitted from the first device to the second device and that is intended to be transferred to the information processing apparatus; and second reception means for receiving the data from the second device if the second device has the data, wherein the search means performs the search even while the second reception means is receiving the data, and if the first device is discovered while the second reception means is receiving the data, reception by the first reception means is prioritized over reception by the second reception means.

According to an aspect of the present invention, there is provided a control method for an information processing apparatus communicable with a device on a first network and with a device on a second network different from the first network, the control method comprising: a search step of searching for a first device on the first network; a first reception step of, if the first device has been discovered in the search step, receiving data from the first device on the first network; a confirmation step of confirming whether or not a second device existing on the second network includes data that has been transmitted from the first device to the second device and that is intended to be transferred to the information processing apparatus; and a second reception step of receiving the data from the second device if the second device includes the data, wherein the search step is performed in parallel with the second reception step, and if the first device has been discovered while the data is being received in the second reception step, performance of the first reception step is prioritized over performance of the second reception step.

According to a further aspect of the present invention, there is provided a program for causing a computer to function as the information processing apparatus according to the present invention.

Further features of the present invention will become apparent from the following description of exemplary embodiments with reference to the attached drawings.

BRIEF DESCRIPTION OF DRAWINGS

FIG. 1 is a block diagram showing an example of a functional configuration of a digital camera as one example of a communication apparatus according to an embodiment.

FIG. 2 is a block diagram showing an example of a functional configuration of a personal computer that can realize an information processing apparatus according to an embodiment.

FIGS. 4A and 4B show examples of pairing information according to the first embodiment.

FIG. 5 is a flowchart showing processing on the PC side in pairing processing for the digital camera and the PC according to the first embodiment.

FIG. 10 shows a transition of a state of the PC according to the first embodiment.

FIG. 16 is a flowchart showing upload processing of the PC according to the second embodiment.

FIG. 17 is a flowchart showing the operations of processing for automatic transfer from the server to the photo storage service server according to the second embodiment.

FIG. 18 shows an example of a screen displayed by the PC according to a third embodiment, showing a list of image files targeted for upload and upload statuses.

DESCRIPTION OF EMBODIMENTS

Figure 3A:
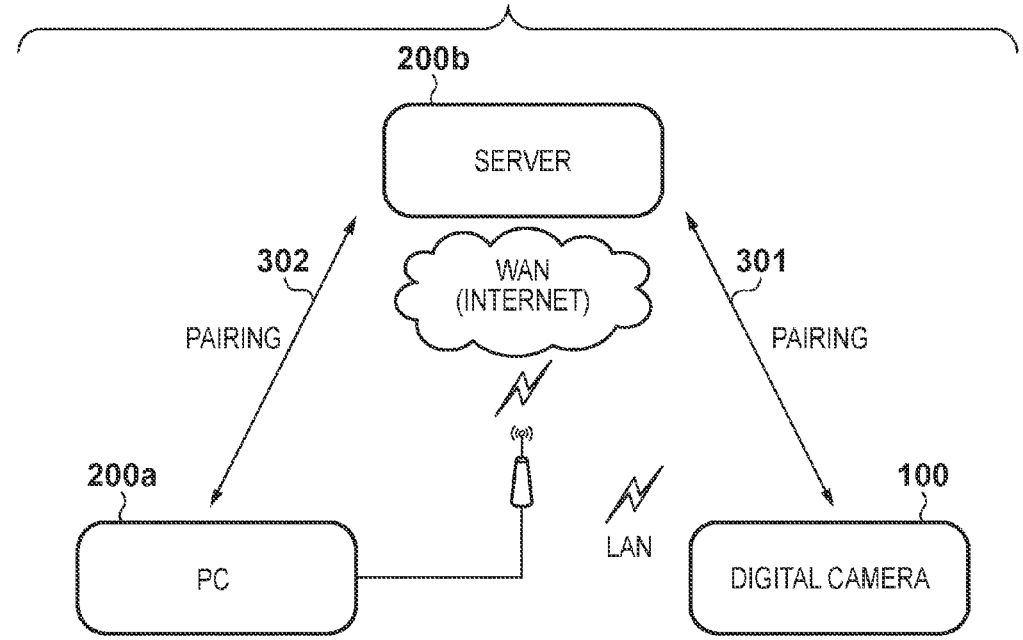
FIGS. 3A and 3B schematically show connection modes of a digital camera, a PC, and a server according to a first embodiment.

Exemplary embodiments of the present invention will now be described in detail in accordance with the accompanying drawings.

Embodiments described below merely present examples of units, circuitries, and/or mechanisms for realizing the present invention, and may be modified or changed as appropriate in accordance with specific configurations of an apparatus to which the present invention is applied and with various conditions. The embodiments may also be combined as appropriate. In the present description, "transfer" has the meaning of both "move" and "copy".

First Embodiment

<Configuration of Digital Camera>

The following describes a digital camera with a wireless communication function as an example of a communication apparatus serving as a data transfer source. It should be noted that the present invention is applicable to any apparatus that has a wireless communication function and can transfer data. Examples of such a terminal include, but are not limited to, a mobile telephone apparatus, a personal computer, a tablet terminal, and a game console.

FIG. 1 is a block diagram showing an example of a functional configuration of a digital camera 100 according to the present embodiment. A control unit 101 is made up of, for example, a CPU (MPU), a memory (DRAM, SRAM), and the like, and controls blocks of the digital camera 100 and data transmission among the blocks by performing various types of processing (programs). The control unit 101 also controls the blocks of the digital camera 100 in accordance with an operation signal from an operation unit 102 that accepts an operation from a user.

The operation unit 102 is made up of, for example, switches for inputting various operations related to image capture, such as a power button, a zoom adjustment button, and an autofocus button. It can also be constituted by a menu display button, an enter button, other cursor keys, a pointing device, a touchscreen, and the like, and transmits an operation signal to the control unit 101 when these keys and buttons are operated by the user. The operation unit 102 further includes a release button which has a switch that is turned ON in a so-called half-pressed state (SW1), and a switch that is turned ON in a so-called fully-pressed state (SW2). An image capture warm-up instruction is output when the SW1 is turned ON, and an image capture instruction is output when the SW2 is turned ON. Image capture warm-up operations include autofocus (AF), automatic exposure control (AE), and the like. While the same release button is used in capturing still images and in capturing moving images in the present embodiment, a button for capturing still images and a button for capturing moving images may be provided separately.

A bus 103 is a general-purpose bus for transmitting various types of data, a control signal, an instruction signal, and the like to the blocks of the digital camera 100.

An imaging unit 110 controls a light amount of an optical image of a subject that entered an imaging lens using a diaphragm, and converts the same into an image signal using an image sensor, such as a CCD image sensor and a CMOS image sensor.

A sound input unit 120 collects the sound around the digital camera 100 using, for example, a built-in non-directional microphone, an external microphone connected via a sound input terminal, and the like.

A memory 104 is, for example, a RAM (random-access memory) and a rewritable non-volatile memory, and temporarily stores an image signal, a sound signal, settings information of the digital camera 100, and the like.

A recording medium 141 is connectable to the digital camera 100. For example, various types of data generated by the digital camera 100 can be recorded into the recording medium 141. Examples of the recording medium 141 include a hard disk drive, an optical disc, and a rewritable non-volatile semiconductor memory. It is assumed in the present embodiment that a so-called memory card, which is a rewritable non-volatile semiconductor memory device that can be loaded into the digital camera 100, is used as the recording medium 141.

A video output unit 150 is made up of, for example, a video output terminal, and transmits an image signal so as to display videos on a connected external display and the like. The video output unit 150 and a later-described sound output unit 151 may be a single integrated terminal, such as an HDMI (registered trademark) terminal.

The sound output unit 151 is made up of, for example, a sound output terminal, and transmits a sound signal so as to output sound from a connected headphone, speaker, and the like. The sound output unit 151 may be built in the digital camera 100.

A communication unit 152 transmits/receives data to/from an external device, in a wired or wireless manner, via serial or parallel communication. Examples of communication interfaces that can be used by the communication unit 152 include RS-232 C, a USB, IEEE 1394, P1284, SCSI, a modem, a LAN, and IEEE 802.11x. The communication unit 152 can also transmit/receive data to/from the external device by performing communication protocols appropriate for communication interfaces. Examples of communication protocols include the HTTP (Hyper Text Transfer Protocol) and PTP-IP (Picture Transfer Protocol over IP). The communication interfaces and communication protocols presented herein as examples are widely known, and therefore a description of their details is omitted. It should be noted that the recording medium 141 may have the functions of the communication unit 152.

A display unit 130 displays image data recorded in the recording medium 141 and GUIs, such as various menus. For example, a liquid crystal display, an organic EL display, and the like can be used as the display unit 130.

<Configuration of Personal Computer (PC)>

A personal computer (PC) that can import still images and moving images will now be described as an example of an information processing apparatus that can realize a user terminal and a server according to the embodiments of the present invention. It should be noted that a tablet PC and a smartphone are also examples of the information processing apparatus.

FIG. 2 is a block diagram showing an example of a functional configuration of a PC 200 according to the present embodiment.

The PC 200 includes a display unit 201, an operation unit 202, a CPU 203, a primary storage apparatus 204, a secondary storage apparatus 205, and a communication apparatus 206.

Fundamental functions of these constituent elements are similar to those of the digital camera 100, and therefore a detailed description thereof is omitted herein. A liquid crystal display, an organic EL display, and the like can be used as the display unit 201. The display unit 201 need not be provided in the PC 200, and it is sufficient for the PC 200 to have a display control function of controlling display on the display unit 201. The primary storage apparatus 204 is, for example, a RAM (random-access memory) and a rewritable non-volatile memory, and holds setting values of the PC, holds/deploys programs performed by the CPU 203, and is used as a working area for the CPU 203 and the like. The secondary storage apparatus 205 is a magnetic recording apparatus such as an HDD and a magnetic tape drive, a storage apparatus that utilizes an optical or magneto-optical medium such as a DVD, a CD, a BD, and an MO, or a storage apparatus that utilizes a non-volatile semiconductor memory such as an SSD. The secondary storage apparatus 205 is used to store various applications (including an OS), user data, and the like.

The CPU 203 controls the blocks of the PC 200 by performing programs (the OS, applications, and the like) deployed to the primary storage apparatus 204. The CPU 203 also controls the blocks in accordance with an operation signal from the operation unit 202 that accepts an operation from the user. Items that are commonly used as the operation unit 202 include, but are not limited to, a keyboard, a mouse, and a touchscreen.

Similarly to the communication unit 152 of the digital camera 100, the communication apparatus 206 performs data communication with an external device using communication interfaces and communication protocols compliant with predetermined standards. The communication unit 152 and the communication apparatus 206 include a plurality of types of communication interfaces, and can perform communication using communication protocols appropriate for the communication interfaces. In the present embodiment, the communication apparatus 206 is configured in such a manner that it can communicate with both of a device on a local area network (LAN) and a device on a wide area network (WAN), such as the Internet. It should be noted that the LAN and the WAN are examples of two different networks, and it is sufficient for the communication apparatus 206 to be connectable to both of a first network that a data transmission source device can access and a second network on which a server providing a data transfer service exists.

A server and a user terminal according to the embodiments can both be realized by the personal computer shown in FIG. 2; however, in the following description, a "PC" denotes a user terminal, and a PC that functions as a server is referred to as a "server" for the sake of convenience.

<Overview of Connection Modes>

Figure 3B:
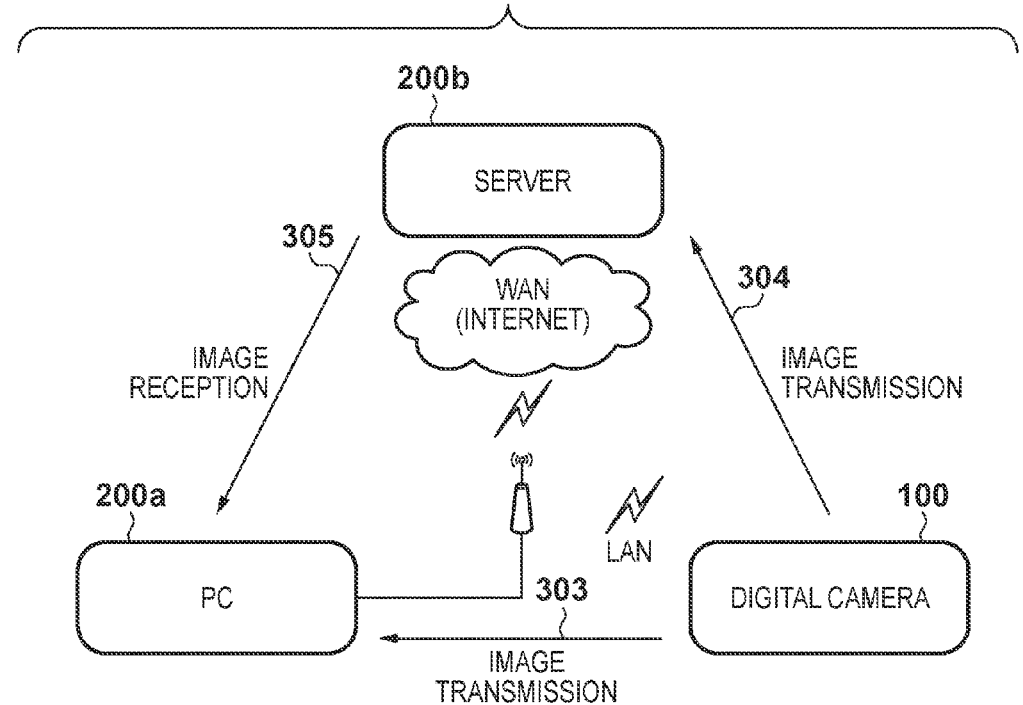

FIGS. 3A and 3B schematically show connection modes of the digital camera 100, a PC 200a, and a server 200b according to the present embodiment. In the present embodiment, one of the following paths can be used: a path via which data in the digital camera 100 arrives in the PC 200a by passing through the WAN (Internet) and the server 200b; and a path via which the data arrives in the PC 200a on the LAN without passing through the server 200b. Such data communication is realized by a communication phase in which the camera and the PC are registered in the server as devices and managed in association with the same user, and a communication phase in which data is transferred from the camera.

FIG. 3A schematically shows the communication phase in which the digital camera and the PC are registered in the server as devices (pairing). In the present embodiment, communication 301 for pairing the digital camera 100 with the server 200b, as well as communication 302 for pairing the PC 200a with the server 200b, is performed while the user is logged into the server 200b. The server 200b can recognize the PC 200a and the digital camera 100 as devices of the same user by managing information of the PC 200a and information of the digital camera 100 in association with a user account.

The user of the digital camera 100 needs to create a user account to use a service provided by the server 200b. The user account is created by, for example, accessing a URL for creating a user account of the server 200b using a web browser application (browser) of the PC 200a, and inputting predetermined user information to a resultant screen displayed on the browser. The server 200b registers the user information (a user ID, a login password, personal information, and the like) in the created user account.

Pairing of the digital camera 100 with the server 200b is processing for registering the digital camera 100 as a device that can access the server 200b. At the time of pairing, the digital camera 100 can be registered in the user account by associating information of the digital camera 100 to be registered in the server 200b with the user account of the user who is logged in.

A specific procedure will now be described. It is assumed here that the digital camera 100 is in a state where it can communicate with the server 200b via a network (for example, the Internet). The digital camera 100 transmits information of itself to the server 200b in response to, for example, a request from the server 200b to the digital camera 100. The information transmitted here includes a model name, unique information for uniquely distinguishing the digital camera, such as a UUID (universally unique identifier) and a GUID (globally unique identifier), and the like.

Upon obtaining the information of the digital camera 100, the server 200b issues an Alias ID unique to the digital camera 100, as well as an Access ID and an Access Password that are used by the digital camera 100 in authentication processing for access to the server 200b. The digital camera 100 stores the Alias ID, Access ID, and Access Password into a non-volatile area of the memory 104 so as to use them later in accessing the server 200b. The Alias ID is unique information which is generated by the server 200b in association with the information of the digital camera 100 and the user account, and which can uniquely identify the digital camera 100. Therefore, upon receiving the Alias ID from the digital camera 100, the server 200b can uniquely identify a digital camera serving as a communication source.

The server 200b registers identification information (for example, the GUID and Alias ID) of the digital camera 100 in association with the user account.

On the other hand, communication 302 for PC-server pairing processing is performed between the PC 200a and the server 200b as follows in a state where pairing processing has been performed in advance between the server 200b and the digital camera 100 via the communication 301.

Prior to the pairing processing, the user logs into the server 200b using his/her account that has already been registered. While there is no restriction on a login method, the login may be performed using, for example, a method in which a URL of the server 200b is accessed through a browser function of a transfer service application running on the PC 200a, and a user ID and a password are input to a displayed login screen. If the user issues an instruction for PC registration from, for example, a service menu screen that is displayed on the transfer service application after normal completion of the login, the server 200b obtains information of the PC 200a through the transfer service application.

The information transmitted here from the PC 200a includes a name of the PC 200a and a GUID (PC GUID) as unique information for uniquely distinguishing the PC 200a. This GUID, which may be a serial number unique to the PC or a character string generated at the time of installation of the transfer service application, needs to be able to uniquely distinguish the PC. Upon obtaining the information of the PC 200a, the server 200b issues an Alias ID dedicated to the PC 200a, as well as an Access ID and an Access Password that are used later for authentication processing in which the PC 200a accesses the server 200b, similarly to the processing for pairing the digital camera 100. The Alias ID is information that can uniquely identify the PC 200a as it is generated by the server in association with the information of the PC 200a and the user account of the user who is logged in. Therefore, the server 200b can uniquely identify the PC 200a upon receiving the Alias ID from the PC 200a.

The server 200b registers identification information (for example, the GUID and Alias ID) of the PC 200a in association with the user account.

Through the above processing, both of the digital camera 100 and the PC 200a are associated with each other in the same user account, and managed by the server 200b as devices related to the same user.

FIG. 3B shows two types of paths via which image data is transmitted from the digital camera 100 to the PC 200a. In the present embodiment, image data is transmitted from the digital camera 100 to the PC 200a via a path that passes through the server 200b (server-mediated transfer) or a path that does not pass through the server 200b (direct transfer).

When the user has issued an instruction for performing backup processing through the operation unit 102, the control unit 101 of the digital camera 100 searches for an already-paired PC on a connected network. If an already-paired PC is discovered, the control unit 101 decides to perform direct transfer to the discovered PC, and transmits data directly to the PC 200a via communication 303.

On the other hand, if an already-paired PC cannot be discovered on the connected network after performing the search for a predetermined time period, the control unit 101 decides to perform the server-mediated transfer. Then, the control unit 101 transmits data to the server 200b via communication 304. The PC 200a also periodically queries the server 200b about whether or not there is new data, and if there is new data, downloads the new data from the server 200b via communication 305. As can be understood from the above, the communication 304 and the communication 305 are not synchronous in the server-mediated transfer.

It should be noted that the search for an already-paired PC on the connected network can be performed using known discovery protocols, such as the UPnP (Universal Plug and Play) and Bonjour. Specifically, it is sufficient to search for a PC on the network, and determine whether or not a discovered PC is an already-paired PC based on an Alias ID included in information obtained from the discovered PC (a description and a TXT record). It should be noted that this determination method is one example, and other methods may be used.

If it is found that the already-paired PC 200*a* is connected to a network to which the digital camera 100 is connected, the control unit 101 decides to perform direct transfer, thereby realizing high-speed data transmission. On the other hand, if an already-paired PC cannot be discovered on the same network, the control unit 101 decides to perform server-mediated transfer. Therefore, the digital camera 100 can transmit data to the PC 200*a* even if the already-paired PC 200*a* has not been activated or exists on another network (for example, if the digital camera 100 is located far from the PC 200*a*).

FIG. 4A shows an example of pairing information that is stored into the digital camera 100 and the server 200*b* as a result of pairing the digital camera 100 with the server 200*b* via the communication 301 of FIG. 3A.

A Camera Name is a model name of the digital camera 100, and is information that has been transmitted from the digital camera 100 to the server 200*b* as camera information. The server 200*b* can use this information in presenting a device registered in a user account.

A Camera GUID is an example of unique information for uniquely distinguishing the digital camera 100, and may be other information. The GUID is also information that has been transmitted from the digital camera 100 to the server 200*b* as camera information.

A Camera Alias ID is unique information appended by the server 200*b* to the registered (paired) digital camera 100 in consideration of user account information, and is information that does not overlap among devices that are paired with the server 200*b*. The Camera Alias ID allows the server 200*b* to uniquely distinguish the digital camera 100.

An Access ID is information issued by the server 200*b* when the digital camera 100 is paired with the server 200*b*, and an authentication ID used when the digital camera 100 communicates with the server 200*b*. The server 200*b* permits communication when the digital camera 100 uses this Access ID and a later-described Access Password in combination. This Access ID can also be used as information that allows the server 200*b* to identify a transmission source camera.

Similarly to the Access ID, an Access Password is information issued by the server 200*b* when the digital camera 100 is paired, and an authentication password used when the digital camera 100 communicates with the server 200*b*.

FIG. 4B shows an example of pairing information that is stored into the PC 200*a* and the server 200*b* as a result of pairing the PC 200*a* with the server 200*b* via the communication 302 of FIG. 3A.

A PC Name is a name of the PC 200*a* (for example, "computer of xx"), and information transmitted from the digital camera 100 to the server 200*b* as PC information. The server 200*b* can use this information in presenting a device registered in a user account.

A PC GUID is information with which the PC 200*a* can be uniquely distinguished, and which has been transmitted from the digital camera 100 to the server 200*b* as PC information. The PC GUID may be a serial number unique to the PC (for example, a value incorporating an Ethernet (registered trademark) MAC address) or a character string generated at the time of installation of the transfer service application.

A PC Alias ID is unique information appended by the server 200*b* to the registered (paired) PC 200*a* in consideration of user account information, and is information that does not overlap among devices that are paired with the server 200*b*. The PC Alias ID allows the server 200*b* to uniquely distinguish the PC 200*a*.

An Access ID and an Access Password are information issued by the server 200*b* when the PC 200*a* is paired with the server 200*b*, and are respectively an authentication ID and an authentication password used when the PC 200*a* communicates with the server 200*b*. The server 200*b* permits communication when the PC 200*a* uses these Access ID and Access Password in combination. These Access ID and Access Password can also be used as information that allows the server 200*b* to identify a transmission source PC.

A description is now given of pairing processing for the digital camera 100 and the PC 200*a*.

FIG. 5 is a flowchart showing processing on the PC 200*a* side in the pairing processing for the digital camera 100 and the PC 200*a* according to the present embodiment. It is assumed that pairing processing for the digital camera 100 and the server 200*b* has already been completed.

In the present embodiment, pairing processing between the digital camera 100 and the PC 200*a* is different from registration of the digital camera 100 in the PC 200*a* via direct connection therebetween using a USB cable and the like. In practice, pairing is performed by the PC 200*a* obtaining and storing pairing information of a digital camera that has already been paired with the server 200*b*. This is because, in the present embodiment, the server 200*b* provides the data transfer service and the PC 200*a* performs pairing only with a digital camera that has already been paired with the server 200*b*. Naturally, in other embodiments, pairing may be performed by connecting the digital camera 100 directly to the PC 200*a* using a USB cable and the like. In this case, the CPU 203 may confirm whether or not pairing with the server 200*b* has already been completed by querying the server 200*b* about a Device Alias ID included in camera information obtained from the digital camera 100. If pairing has already been completed, the CPU 203 obtains pairing information from the server 200*b* and stores the pairing information into, for example, the secondary storage apparatus 205.

First, in step S501, the CPU 203 logs into the server 200*b* through the communication apparatus 206. The CPU 203 uses the Access ID and Access Password included in the pairing information at the time of login to the server 200*b*. It also requests a user login where necessary. In this case, the user inputs account information (a user ID and a password) to an application screen.

In step S502, the CPU 203 obtains, from the server 200*b*, a list of pairing information of devices that are managed in the server 200*b* in association with the account of the user who is logged in and have already been paired with the server 200*b*. More specifically, the CPU 203 obtains a list related to cameras among already-paired devices. The list contains, for example, a model name (Camera Name), a GUID (Camera GUID), and an Alias ID (Camera Alias ID) of a digital camera included in the pairing information shown in FIG. 4A.

If information of a plurality of digital cameras is contained in the obtained list, the CPU 203 displays the information of these digital cameras in a selectable manner in a list on the display unit 201, and suggests the user to select a digital camera to be paired in step S503. At this time, the CPU 203 may not display information of already-paired digital cameras. The user selects a desired digital camera through the operation unit 202. On the other hand, if information of one digital camera is contained in the obtained list, the CPU 203 can consider that this digital camera has been selected and skip the process of step S503.

In step S504, the CPU 203 requests the server 200b to perform pairing with the selected digital camera. In response to this request, the server 200b transmits pairing information 401 (FIG. 4A) of the designated digital camera to the PC 200a. The PC 200a stores the received pairing information of the digital camera into, for example, the secondary storage apparatus 205 as management information in step S505, and ends processing.

In this way, the PC 200a performs pairing with the digital camera 100 by obtaining and storing pairing information of a digital camera that has already been paired with the server 200b.

<Transmission Processing>

Figure 6:
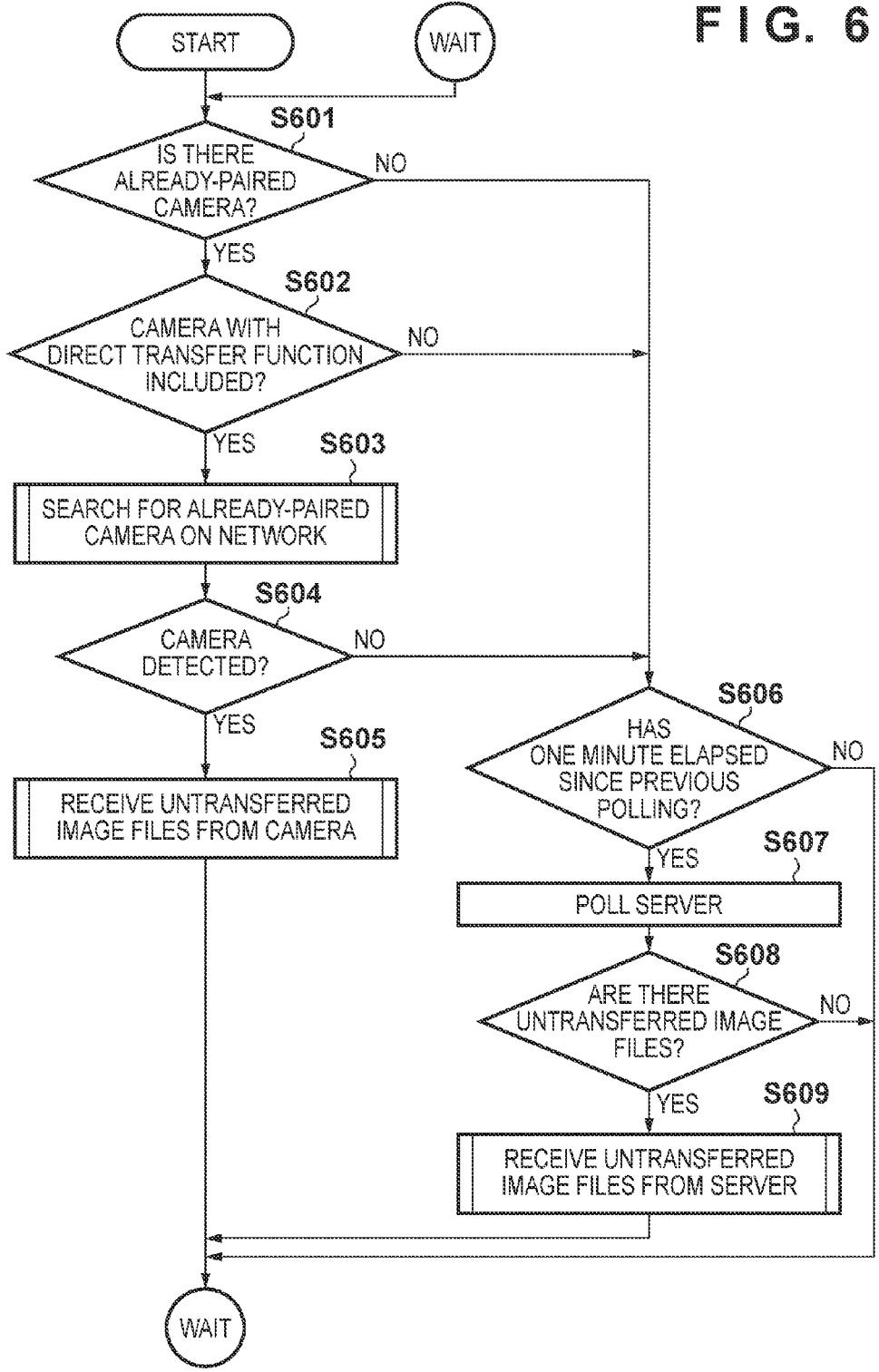
FIG. 6 is a flowchart showing an overview of processing that is performed by the PC according to the first embodiment to receive data transmitted from the digital camera.

FIG. 6 is a flowchart showing an overview of processing that is performed by the PC 200a according to the present embodiment to receive data transmitted from the digital camera 100. As stated earlier, in the present embodiment, the digital camera 100 may use server-mediated transfer or direct transfer to transmit data to the PC 200a. Therefore, the PC 200a needs to operate such that it can receive data appropriately whichever the route via which the data has been transmitted.

The processing shown in FIG. 6 is performed by the CPU 203 reading the transfer service application, which is provided by the server 200b and installed in the PC 200a, from the secondary storage apparatus 205 to the primary storage apparatus 204 and performing the read transfer service application.

In step S601, the CPU 203 determines whether or not at least one digital camera is paired with the PC 200a based on stored pairing information. If no digital camera is paired, that is to say, if no pairing information is stored, the CPU 203 proceeds to a process of step S606. On the other hand, if there is at least one already-paired digital camera, the CPU 203 proceeds to a process of step S602.

In step S602, the CPU 203 determines whether or not already-paired digital cameras include a digital camera that has a function of direct transfer to the PC. This determination may be made based on model names of already-paired digital cameras, or using other methods. For example, if a method of managing pairing information and a format of pairing information adopted by the server 200b (a second device) differ between digital cameras capable of direct transfer and digital cameras incapable of direct transfer, this determination may be made using this information.

In step S602, the CPU 203 proceeds to a process of step S603 if a digital camera capable of direct transfer has already been paired, and proceeds to a process of step S606 if the already-paired digital cameras do not include any digital camera capable of direct transfer.

In step S603, the CPU 203 searches for the already-paired digital camera (a first device) capable of direct transfer by transmitting a device search command to a local area network to which the communication apparatus 206 is connected. As will be described later, if a digital camera capable of direct transfer is discovered through the device search on the LAN, the CPU 203 may query the server 200b on the WAN about whether or not the discovered digital camera has already been paired (or whether or not pairing is valid).

In step S604, if the CPU 203 detects the existence of the already-paired digital camera capable of direct transfer on the LAN through the search in step S603, it communicates with the digital camera and receives unobtained data (a still image, a moving image, sound, and the like) in the digital camera in step S605. The CPU 203 stores the received data into, for example, the secondary storage apparatus 205 and returns to a wait state.

On the other hand, in step S604, if the CPU 203 cannot detect the existence of the already-paired digital camera capable of direct transfer on the LAN through the search in step S603, the CPU 203 queries the server 200b about whether or not there is untransferred data, and if there is untransferred data, performs processes for obtaining the untransferred data from step S606. Although not shown in FIG. 6, the CPU 203 continuously (parallelly) performs the search process of step S603 after processing moves to step S608.

In the present embodiment, the transfer service application is configured to poll the server 200b on the WAN once every minute while it is running. Therefore, in step S606, the CPU 203 determines whether or not one minute (or more) has elapsed since the previous polling, and polls the server if one minute (or more) has elapsed (step S607).

Specifically, the CPU 203 requests the server 200b for a list of untransferred data in step S607. The server 200b manages a list of data that has not been transferred to the PC 200a among data transferred from the digital camera 100. Therefore, the CPU 203 can determine whether or not there is untransferred data based on whether or not this list contains one or more pieces of data (step S608). It should be noted that the determination about whether or not there is untransferred data may be made using other methods.

If the CPU 203 determines in step S608 that there is untransferred data in the server 200b, it requests the server 200b for the data using information contained in the list and receives the untransferred data in step S609. Then, the CPU 203 stores the received data into, for example, the secondary storage apparatus 205 and returns to the process of step S601.

The CPU 203 also returns to the process of step S601 if the polling interval has not elapsed in step S606, and if it is determined in step S608 that there is no untransferred data.

It should be noted that if the existence of the already-paired digital camera capable of direct transfer on the LAN is detected during the processes of steps S606 to S609, the CPU 203 interrupts the process that is being performed and proceeds to the process of step S605. The CPU 203 then receives data transmitted directly from the discovered digital camera.

If reception of data is interrupted in step S609, the CPU 203 discards the data for which reception was interrupted midway, and re-obtains the data from the server 200b after data reception through direct transfer has ended. In the process of step S609, if reception of data is completed normally, the CPU 203 notifies the server 200b of the completion. In response to this notification, the server 200b deletes, from the list, the data for which the notification of completion of reception has been received. Therefore, data for which reception was interrupted remains in the list; this allows the PC 200a to re-obtain the data as untransferred data at the time of next polling.

It should be noted that if the existence of the already-paired digital camera capable of direct transfer on the LAN is detected during the processes of steps S606 to S609, processing may proceed to step S605 after continuing reception of data that is currently being received to the end.

Figure 7:
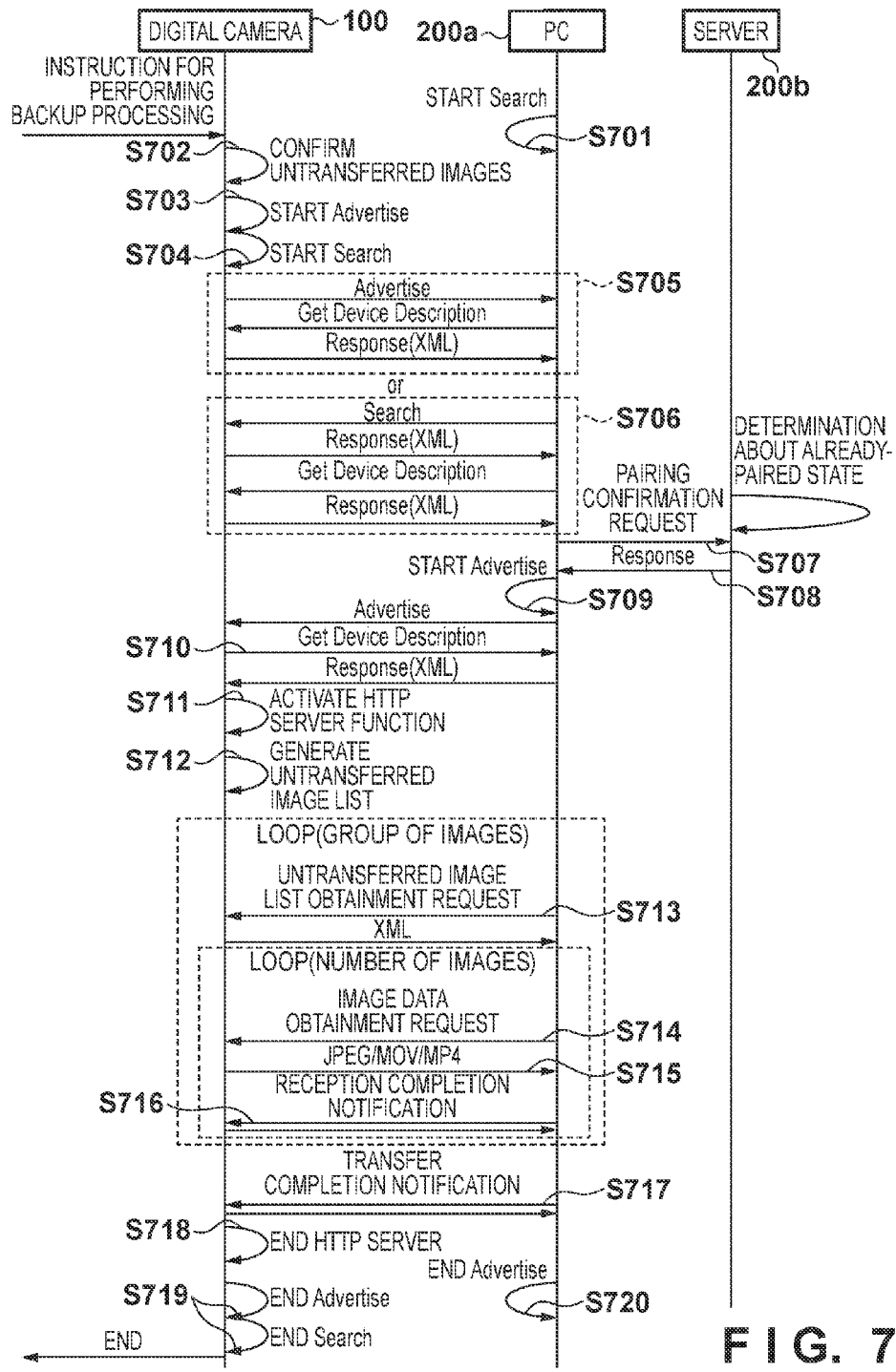
FIG. 7 is a sequence diagram showing processing for data transfer among the digital camera, the PC, and the server according to the first embodiment.

FIG. 7 is a sequence diagram showing processing for data transfer among the digital camera 100, the PC 200a, and the server 200b according to the present embodiment.

The CPU 203 of the PC 200a always performs the processing of FIG. 6 while the transfer service application is running. That is to say, it polls the server 200b on the WAN at regular intervals, and performs device search on a connected LAN so as to determine whether or not an already-paired digital camera capable of direct transfer has been detected (step S701). The device search is performed using a protocol-appropriate method, for example, by issuing a Search command in the case of the UPnP.

When the user issues an instruction for performing backup processing through the operation unit 102, the control unit 101 of the digital camera 100 confirms whether or not there are files that have not been backed up, that is to say, untransferred data in the recording medium 141 (step S702). It should be noted that data types targeted for backed up may be separately configurable. While it is assumed here that image data files are targeted for transfer for the sake of convenience, transfer processing is similarly applicable to any other data files regardless of data types. The control unit 101 can also determine whether or not files in the recording medium 141 are untransferred files by appending information indicating an already-transferred state to transferred files, and by using a table that manages an already-transferred state and an untransferred state on a file-by-file basis.

Thereafter, the control unit 101 issues an advertisement command (for example, an Advertise command of the UPnP) for notifying a connected local area network of the existence of itself through the communication unit 152 (step S703). At the same time, the control unit 101 issues a device search command (for example, a Search command of the UPnP) to the connected local area network, and waits for a response from another device on the network (step S704).

The CPU 203 of the PC 200a detects the appearance of the digital camera 100 by receiving the advertisement command from the digital camera 100 (step S705), or by receiving a response from the digital camera 100 to the Search command of the UPnP issued in step S701 (step S706).

The CPU 203 transmits a device information obtainment request (Get Device Description) to the digital camera 100 whose appearance has been detected. The CPU 203 proceeds to subsequent pairing confirmation processes only if it has been able to determine that the digital camera 100 is capable of direct transfer from device information (Response (XML)) obtained from the digital camera 100. If it has not been able to determine that the digital camera 100 is capable of direct transfer, it waits for a response from another device.

It is assumed here that the digital camera 100 has been determined to be capable of direct transfer (to have a direct transfer function). Then, the CPU 203 of the PC 200a issues a paring state confirmation request to the server 200b using the Alias ID allocated to the PC 200a and the Alias ID of the digital camera 100 included in the obtained device information (step S707).

If the Alias ID of the digital camera 100 included in the obtained device information is included in pairing information stored in the secondary storage apparatus 205, the digital camera 100 has already been paired. In this case, there is fundamentally no necessity to issue the confirmation request to the server 200b. However, as there is a possibility that the pairing has already been cancelled through a procedure for the server 200b side, the confirmation request is issued to confirm the latest validity of the pairing in the present embodiment. In another embodiment, if the pairing information including the Alias ID of the digital camera 100 is stored, it is permissible to adopt a configuration in which the validity of the pairing is confirmed by issuing the confirmation request to the server 200b only if a predetermined time period or more has elapsed since the pairing information was stored. In this case, the CPU 203 of the PC 200a may update information related to the time when the pairing information was stored if an already-paired state has been confirmed, and delete the pairing information from the secondary storage apparatus 205 if an unpaired state (cancellation) has been confirmed.

The CPU 203 of the server 200b examines whether or not any of the Alias IDs included in the pairing information associated with account information of the user who is logged into the PC 200a matches the Alias ID of the digital camera 100 transmitted from the PC 200a. If there is a matching Alias ID, the CPU 203 of the server 200b determines that the digital camera 100 is associated with the user who is logged into the PC 200a. The CPU 203 of the server 200b notifies the PC 200a of the result of the determination (step S708).

If it has been confirmed that the digital camera 100 is the already-paired device, the CPU 203 of the PC 200a obtains the pairing information of the digital camera 100 from the server 200b and stores the obtained pairing information into the secondary storage apparatus 205, as described above. The CPU 203 also performs an advertisement process for notifying the connected local area network of the existence of itself (for example, issues an Advertise command of the UPnP (step S709)). If it has been determined that the discovered digital camera 100 is an unpaired device, processing is ended without issuing the Advertise command.

When the control unit 101 of the digital camera 100 detects the appearance of the PC 200a by receiving the Advertise command from the PC 200a, it transmits a device information obtainment request (Get Device Description) to the PC 200a (step S710). At this point, the PC 200a and the digital camera 100 have detected each other and can communicate with each other on the local area network. The control unit 101 proceeds to subsequent image transfer processing only if the PC 200a has been determined to be capable of direct transfer from the obtained device information. It is assumed here that the PC 200a has been determined to be capable of direct transfer.

In the present embodiment, image transfer processing is realized by the PC 200a issuing an image file obtainment request to the digital camera 100 as an HTTP client. To this end, the control unit 101 activates an HTTP server application at the beginning of the image transfer processing such that the PC 200a can perform communication as the HTTP client (step S711). The control unit 101 also generates a list of untransferred image files detected in step S702 (step S712).

The CPU 203 of the PC 200a transmits an untransferred image list obtainment request to the digital camera 100 (step S713). The CPU 203 transmits an image file obtainment request to the digital camera 100 based on information for identifying untransferred images described in an untransferred image list obtained from the digital camera 100 (step S714). In response, the control unit 101 transmits requested image files to the PC 200a (step S715).

When the reception of the image files is completed normally, the CPU 203 notifies the digital camera 100 of the completion of the reception (step S716). Upon receiving the notification of the completion of the reception, the control unit 101 considers that the target image files have already been transferred, and deletes the target image files from the untransferred image list. The control unit 101 may append information that enables the image files to be distinguished as already-transferred files to the image files.

When the obtainment of all image files described in the untransferred image list is completed, the CPU 203 of the PC 200*a* issues an untransferred image list obtainment request to the digital camera 100 again (step S713). If untransferred images have been added due to, for example, image capture performed after the earlier obtainment of the untransferred image list, the CPU 203 obtains the added image files. If the CPU 203 determines that there is no untransferred image file with reference to the untransferred image list, it notifies the digital camera 100 of completion of transfer (step S717).

Upon reception of the notification of completion of transfer, the control unit 101 ends the HTTP server application (step S718), and further ends the advertisement process and the search process started in steps S703 and S704 (step S719). The CPU 203 of the PC 200*a* similarly ends the advertisement process started in step S709 (step S720).

This concludes the sequence of processes performed when the digital camera 100 is instructed by the user to perform the backup processing.

Subsequently, processing of the digital camera 100 and processing of the PC 200*a* will be described below with reference to flowcharts of FIGS. 8 and 9.

Figure 8:
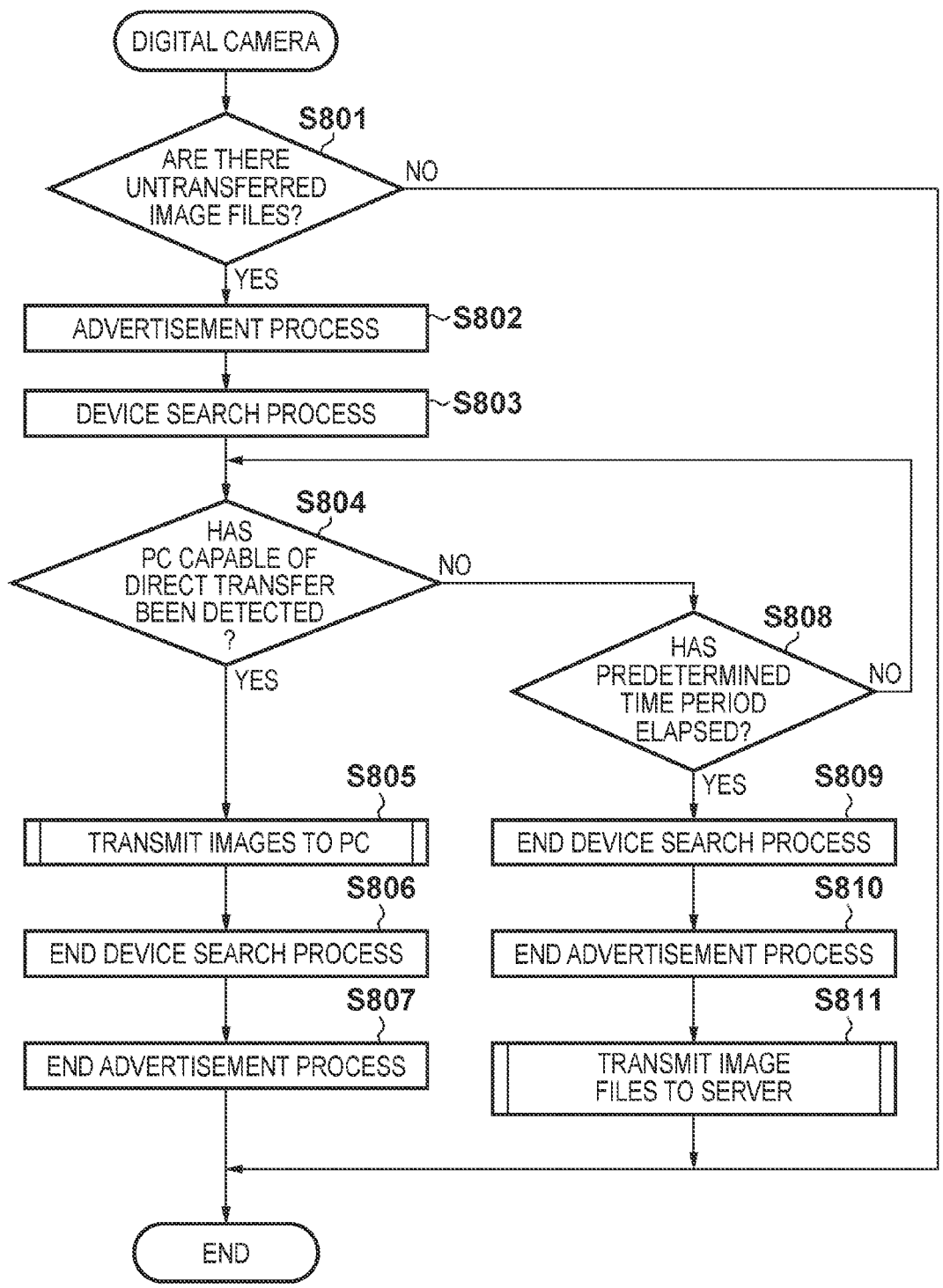
FIG. 8 is a flowchart showing processing performed when the digital camera according to the first embodiment transfers data to the PC or the server.

FIG. 8 is a flowchart showing processing performed when the digital camera 100 according to the present embodiment transfers data to the PC 200*a* or the server 200*b*. While FIG. 7 only illustrates the case of direct transfer to the PC 200*a*, FIG. 8 shows entire processing including server-mediated transfer.

In step S801, the control unit 101 examines whether or not there are files that have not been backed up, that is to say, untransferred image files in the recording medium 141. While the digital camera 100 according to the present embodiment manages whether or not images are untransferred images using flags recorded in files, the management is not limited to this method.

The control unit 101 ends processing if there is no untransferred image file, and proceeds to a process of step S802 if there are untransferred image files.

In step S802, the control unit 101 performs an advertisement process on a connected local area network (for example, issues an Advertise command of the UPnP).

In step S803, the control unit 101 performs a device search process on the connected local area network (for example, issues a Search command of the UPnP). If there is a device that has responded to the device search command, the control unit 101 obtains device information, and determines whether or not the device is a PC with a direct transfer function based on, for example, a model name, capability information, and the like included in the device information.

The control unit 101 waits a predetermined time period (for example, 10 seconds) for a response from a PC capable of direct transfer to the device search command (steps S804 and S808). If there is no response from a PC capable of direct transfer within the predetermined time period (YES of step S808), the control unit 101 switches a transfer route from direct transfer to server-mediated transfer, and starts processing for transfer to the server.

In steps S809 and S810, the control unit 101 ends the device search process and the advertisement process started in steps S803 and S802. The control unit 101 then performs server-mediated transfer processing in step S811. At this time, the digital camera 100, which serves as an HTTP client, starts processing for transmitting images to the server 200*b* that functions as an HTTP server. The server-mediated transfer is processing for transmitting untransferred image files to the server 200*b* with which the digital camera 100 has already been paired; however, as it has no direct relationship to the present invention, a description of its details is omitted.

On the other hand, if the appearance of the PC 200*a* capable of direct transfer is detected within the predetermined time period in step S804, the control unit 101 performs processing for transferring images to the PC 200*a* via direct transfer in step S805. As described with reference to FIG. 7, in the processing for transferring images via direct transfer, the control unit 101 performs, for example, transmission of an untransferred image list and transmission of designated untransferred image files in response to a request from the PC 200*a*. At this time, image transfer is realized as follows: the PC 200*a* serving as an HTTP client requests the digital camera 100 serving as an HTTP server for untransferred image files. When the processing for transferring images to the PC 200 via direct transfer is ended, the control unit 101 ends the device search process and the advertisement process started in steps S803 and S802, thus ending the entire processing in steps S806 and S807.

Figure 9:
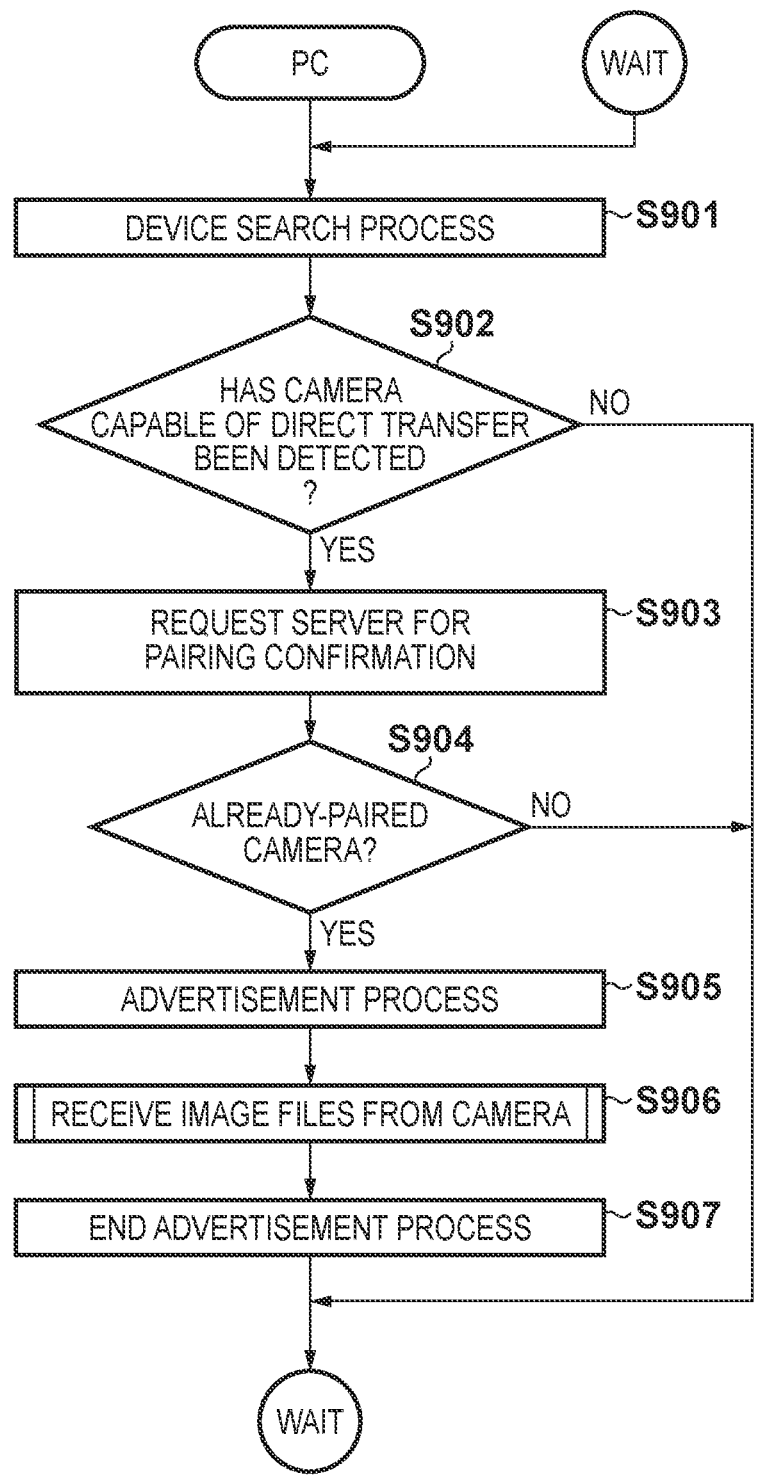
FIG. 9 is a flowchart showing image reception processing of the PC according to the first embodiment.

FIG. 9 is a flowchart showing processing of the PC 200*a* according to the present embodiment, and corresponds to the processing illustrated in FIG. 7.

Steps S901 and S902 represent a phase until the detection of the appearance of a digital camera with a direct transfer function.

It is assumed that the transfer service application is running on the PC 200*a*. Therefore, as stated earlier, it polls the server 200*b* at regular intervals, and performs device search on the connected local area network so as to determine whether or not an already-paired digital camera capable of direct transfer has been detected (step S901).

If the device is discovered on the network, the CPU 203 obtains device information from the discovered device, and confirms whether or not the device is a camera capable of direct transfer based on a model name and capability information included in the device information (corresponding to steps S705 and S706).

If the CPU 203 cannot discover a camera capable of direct transfer on the local area network in step S902, it returns to the process of step S901 and continues the device search process.

Steps S903 and S904 represent a pairing confirmation phase.

In step S903, the CPU 203 queries the server 200*a* about whether or not the camera capable of direct transfer, which has been discovered on the local area network, is an already-paired camera associated with the same user (corresponding to step S707).

If the CPU 203 receives, from the server 200*b*, a notification to the effect that the discovered camera has been confirmed to be an already-paired device (YES of step S904), it performs an image reception phase from step S905.

On the other hand, if the CPU 203 receives a notification to the effect that the discovered camera is not an already-paired device (NO of step S904), it returns to the process of step S901 and continues the device search on the local area network.

In step S905, the CPU 203 attempts to wirelessly connect to the already-paired camera capable of direct transfer (the digital camera 100) by performing an advertisement process on the local area network (corresponding to steps S709 and S710). Upon establishment of wireless connection to the digital camera 100, the CPU 203 serves as an HTTP client and obtains untransferred image files from the digital camera 100 serving as an HTTP server (step S906), as illustrated by steps S713 to S717.

The CPU 203 shuts down the wireless connection to the digital camera 100 in step S907, and processing returns to a wait state of step S901 (corresponding to step S720).

FIG. 10 shows a transition of a state of the PC 200a according to the present embodiment.

In the present embodiment, a default state of the PC 200a is an unconfigured state 1001 in which there is no already-paired camera. After connecting to the server 200b in the unconfigured state 1001, if the processing for pairing with a camera described with reference to the flowchart of FIG. 5 is performed, the PC 200a makes a transition to a waiting state 1002. If there is pairing information of an already-paired camera at the time of activation of the transfer service application, the waiting state 1002 takes place from the beginning.

In the waiting state 1002, the PC 200a performs the following processes in parallel: a process for searching for an already-paired camera capable of direct transfer on a local area network; and a process for polling the server 200b on an external network (a network on which the server 200b exists).

When the PC 200a detects that there are recently arrived (untransferred) image files in the server 200b as a result of polling the server 200b, it makes a transition to a state 1003 of "Receive Image from Server". In this state, the CPU 203 performs processing for receiving the newly-arrived image files in the server 200b.

If an already-paired camera capable of direct transfer is detected on the local area network in the waiting state 1002, the PC 200a makes a transition to a state 1004 of "Receive Image from Camera". In this state, the CPU 203 receives all untransferred image files transmitted from the digital camera 100.

When the processing in either the state 1003 of "Receive Image from Server" or the state 1004 of "Receive Image from Camera" is ended, the PC 200a makes a transition to the waiting state 1002.

As stated earlier, in the state 1003 of "Receive Image from Server", the device search on the local area network is continuously performed. Then, as soon as an already-paired camera capable of direct transfer is detected on the local area network, the PC 200a makes a transition to the state 1004 of "Receive Image from Camera". That is to say, in the PC 200a according to the present embodiment, the state 1004 of "Receive Image from Camera" has higher priority than the state 1003 of "Receive Image from Server".

As described above, the present embodiment enables realization of an information processing apparatus that can receive data appropriately, even if there is a possibility that the data is transferred via a route of direct transfer from a device (for example, a mobile terminal) and via a route of server-mediated transfer.

In particular, the search for a device with a direct transfer function is continued even during reception of data from a server, and if the device with the direct transfer function is discovered, direct transfer from the device is prioritized over data reception from the server; therefore, there is no need for the device to wait, and great usability is provided. On the other hand, if the device with the direct transfer function is not discovered, processing for receiving untransferred data in the server is performed; in this way, data transferred via a server-mediated route can be received without delay.

Second Embodiment

The first embodiment has described a technique to enable the use of direct transfer and server-mediated transfer in a data transfer service for backing up data in the digital camera 100 to a predetermined destination device. The present embodiment relates to a technique to add a function of automatically transferring data to a device on a network that differs from a predetermined destination device in a data transfer service.

<Overview of Connection Modes>

Similarly to FIGS. 3A and 3B, FIGS. 11A to 11C schematically show connection modes of the digital camera 100, the PC 200a, the server 200b, and a photo storage service server 200c according to the present embodiment. In the present embodiment, transmission/reception of data among these four devices has three phases shown in FIGS. 11A to 11C.

Figure 11A:
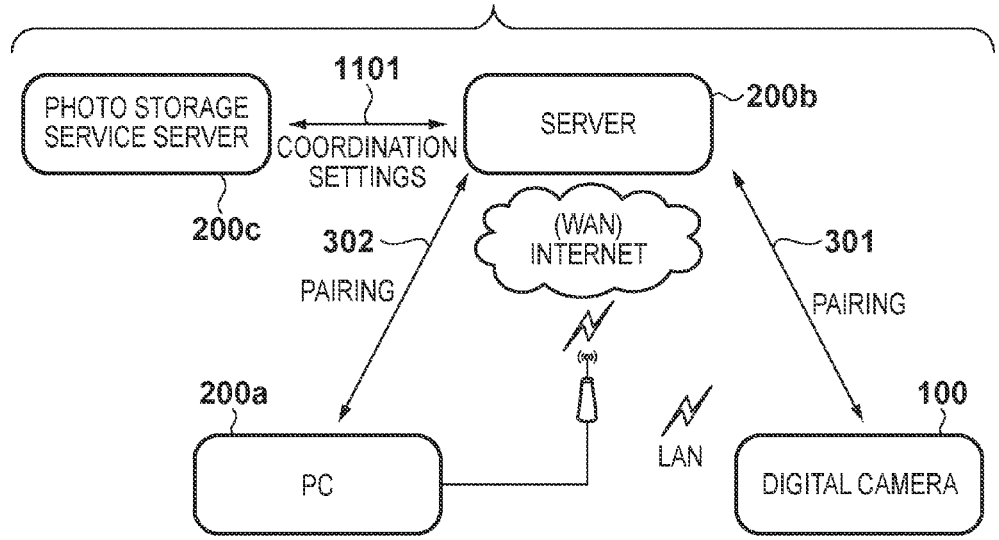
FIGS. 11A to 11C schematically show connection modes of the digital camera, the PC, the server, and a photo storage service server according to a second embodiment.

FIG. 11A shows a mode realized by adding coordination settings 1101 between the server 200b and the photo storage service server 200c to the connection mode of the first embodiment described with reference to FIG. 3A.

The coordination settings 1101 enable the use of the photo storage service server 200c on the Internet, in addition to the PC 200a, as a destination device for data transmitted from the digital camera 100 to the server 200b. In order to enable transmission of images from the server 200b to the photo storage service server 200c, the coordination settings 1101 permit access when both of the server 200b and the photo storage service server 200c are logged into a user account. Specifically, access permission is provided using methods such as client authentication and OAuth.

Figure 11B:
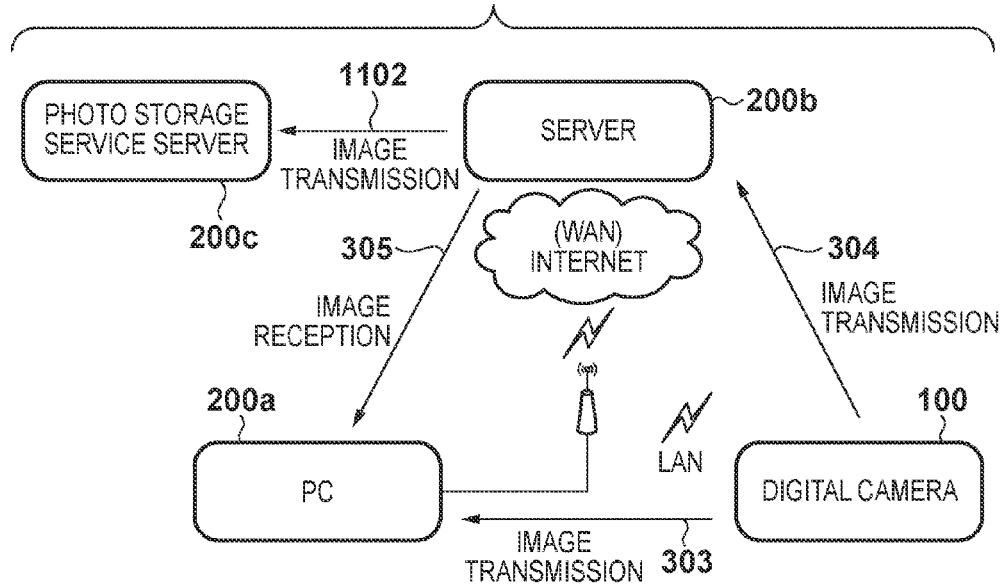

FIG. 11B shows a mode realized by adding image communication 1102 from the server 200b to the photo storage service server 200c to the connection mode of the first embodiment described with reference to FIG. 3A. In this mode, data transmitted from the digital camera 100 to the server 200b is transferred not only to the PC 200a, but also to the photo storage service server 200c on the Internet.

Figure 11C:
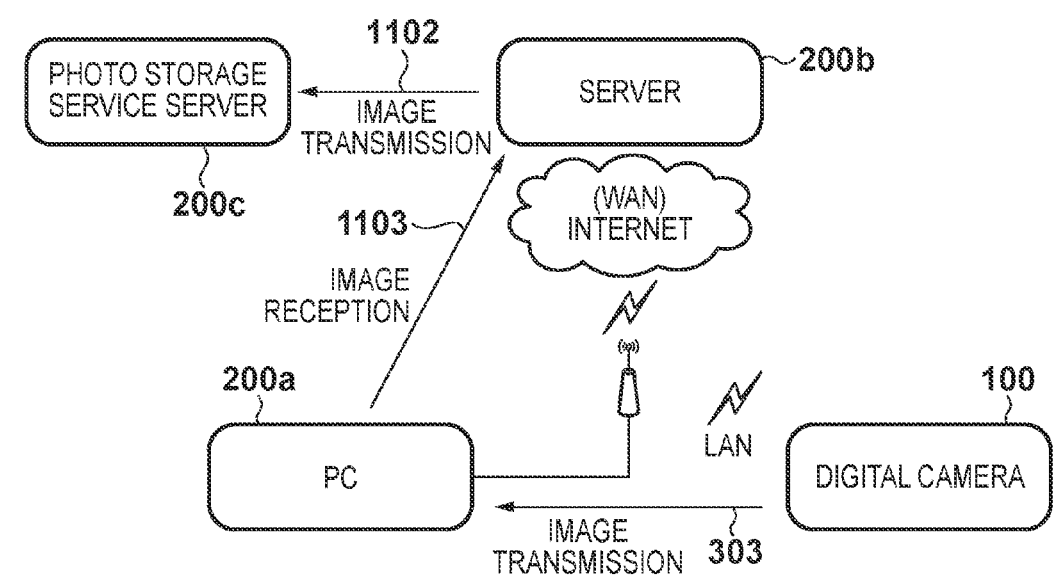

FIG. 11C shows a connection mode specific to the present embodiment. Specifically, in this mode, data transmitted from the digital camera 100 to the PC 200a through image transmission 303 using a direct transfer function is transmitted from the PC 200a to the server 200b, and then from the server 200b to the server 200c through image transmission 1102.

This is not server-mediated transfer, but is processing in which data that has been transferred directly from the digital camera 100 to the PC 200a is transferred to the photo storage service server 200c.

Figure 12A:
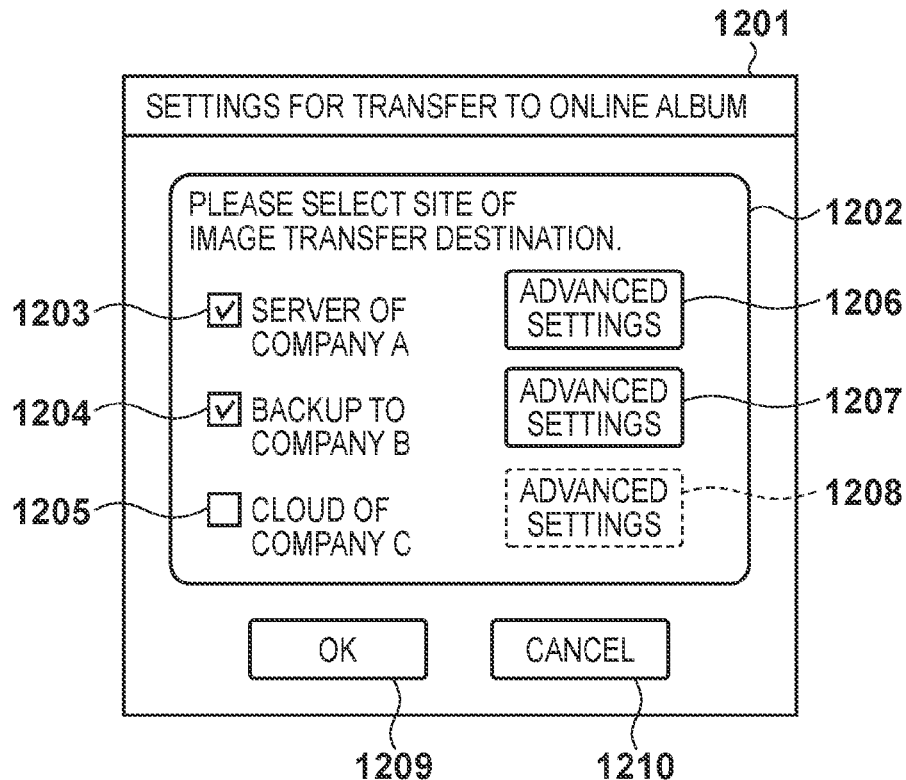
FIGS. 12A and 12B show examples of settings screens for a function of automatically transferring images to a photo storage service according to the second embodiment.
Figure 12B:
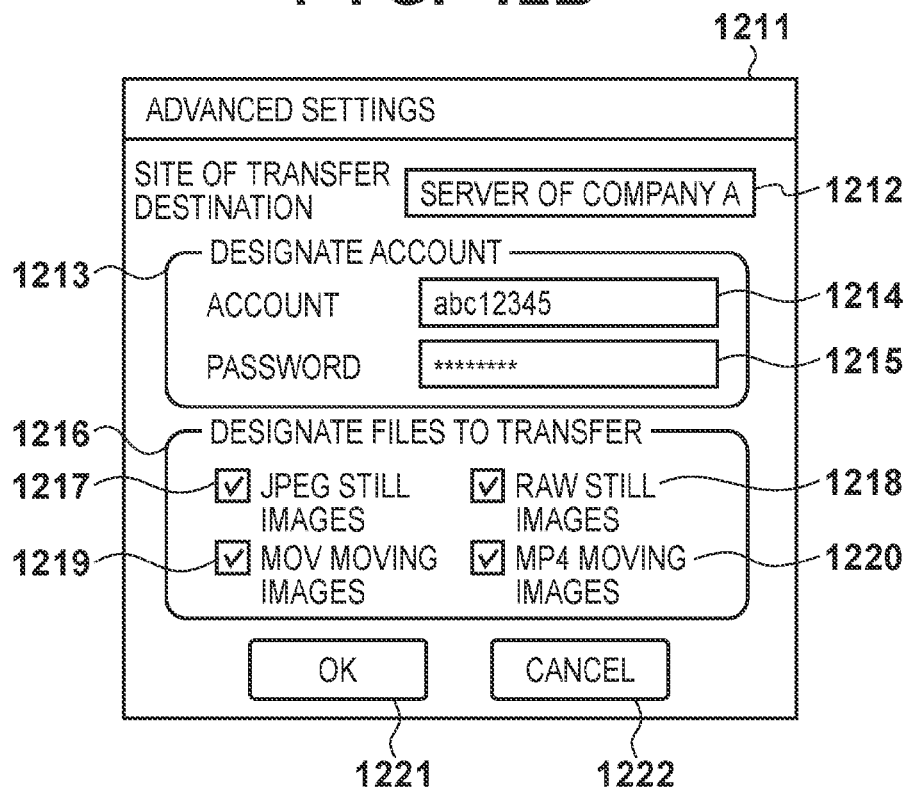

FIGS. 12A and 12B show examples of settings screens for a function of automatically transferring images to a photo storage service according to the present embodiment. A settings screen 1201 shown in FIG. 12A is prepared as a part of a function of the transfer service application running on the PC 200a. While the settings screen 1201 is provided as a part of a function of a dedicated application in the present embodiment, it may be provided by the server 200b as a webpage for configuring the data transfer service. In this case, the settings screen 1201 can be provided not only by any application with a web browser function on the PC 200a, but also by any device that can access the server 200b (for example, a smartphone). Either way, any information configured on the settings screen 1201 is assumed to be managed by the server 200b.

The settings screen 1201 includes an operation unit 1202 for selecting a transfer destination server 200c in relation to the photo storage (online album) service; in the present embodiment, one or more servers (services) can be selected from among three types of pre-set servers (services).

Checkboxes 1203, 1204, 1205 are provided in correspondence with the three pre-set transfer destination servers, and indicate that corresponding transfer destination servers are used when in a checked state, and corresponding transfer destination servers are not used when in an unchecked state.

The checkboxes 1203, 1204, 1205 are provided in one-to-one correspondence with the transfer destination servers, and therefore enable designation of transfer to a plurality of transfer destination servers.

Advanced settings buttons 1206, 1207, 1208 are provided in one-to-one correspondence with the transfer destination servers to display an advanced settings screen 1211 (described later) for designating advanced settings of the corresponding transfer destination servers, and are enabled only if the corresponding checkboxes are in a checked state.

In the figure, the advanced settings button 1208 corresponding to the checkbox 1205 in an unchecked state is disabled, whereas the advanced settings buttons 1206, 1207 corresponding to the checkboxes 1203, 1204 in a checked state are enabled.

An OK button 1209 is for closing the settings screen 1201 with the displayed state of settings reflected in the current settings, and a Cancel button 1210 is for closing the settings screen 1201 without the displayed state of settings reflected in the current settings.

FIG. 12B shows an example of the advanced settings screen 1211 that is activated by pressing the advanced settings button 1206. If another advanced settings button is pressed, an advanced settings screen including items related to a corresponding server is displayed.

Information for distinguishing a transfer destination server 200c associated with an advanced settings panel is described in reference numeral 1212.

An input area 1213 for account information required to access the transfer destination server includes an account ID input area 1214 and a password input area 1215.

It should be noted that characters input to the password input area 1215 are echoed back using masked characters for the purpose of ensuring security.

In a selection area 1216 for designating types of files targeted for transfer, checkboxes 1217, 1218, 1219, 1220 are provided to designate types of files to be automatically transferred from among types of files supported by the server (service). Types of files designated by these checkboxes 1217 to 1220 are configured as types of files to be transferred to the corresponding server. As these checkboxes are independent from one another, a plurality of types of files can be designated simultaneously in any combination.

Types of files supported by the transfer destination service may be configured manually by an administrator of the server 200b in advance, and may be obtained by the server 200b querying the servers 200c of the respective services.

An OK button 1221 is for closing the advanced settings screen 1211 with the displayed state of settings reflected in the current settings, and a Cancel button 1222 is for closing the advanced settings screen 1211 without the displayed state of settings reflected in the current settings.

<Transmission Processing>

Figure 13:
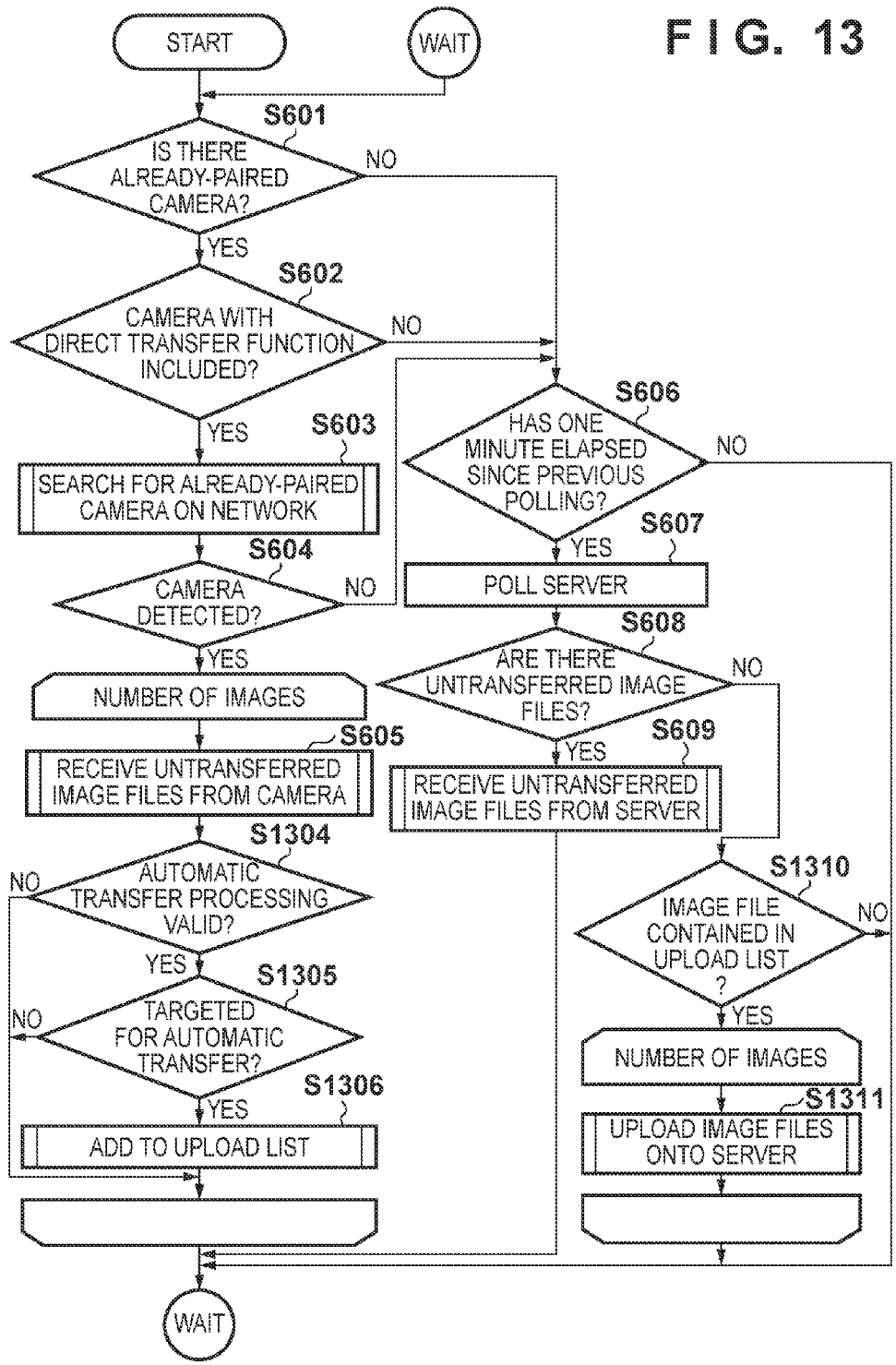
FIG. 13 is a flowchart showing an overview of processing that is performed by the PC according to the second embodiment to receive data transmitted from the digital camera.

FIG. 13 is a flowchart showing the operations of the PC 200a according to the present embodiment; processes similar to those of FIG. 6 are given the same reference numerals thereas, and overlapping descriptions are omitted. The processes performed in steps S601 to S609 are fundamentally the same as those performed in the first embodiment.

It should be noted that, at the time of issuing a confirmation request to the server 200b about a pairing status of a digital camera capable of direct transfer, the PC 200a according to the present embodiment obtains, from the server 200b, the contents of settings related to automatic transfer to the photo storage service server 200c. Then, the PC 200a uploads image files that are transferred directly from the digital camera 100 later onto the server 200b in accordance with the contents of settings obtained at this point. The server 200b further transfers, to the photo storage service server 200c, the image files that have been automatically transferred from the PC 200a in accordance with automatic transfer settings.

As described above, in the present embodiment, automatic transfer settings are managed by the server 200b, and can be configured and changed by any device that can log into the server 200b at any timing. For example, assume that the user has caused the digital camera 100 to transmit, to the PC 200a, image files that are intended to be automatically transferred to the photo storage service server 200c using a direct transfer function. Also assume that, before the PC 200a uploads these image files onto the server 200b, the user has accessed the server 200b from a smartphone or a tablet terminal and changed the contents of automatic transfer settings. In this case, if the server 200b performs automatic transfer processing based on automatic transfer settings at the time of the upload of the image files from the PC 200a, there is a possibility that automatic transfer processing that is different from the one intended by the user at the timing of direct transfer is performed. Therefore, in the present embodiment, image files that the PC 200a receives from the digital camera 100 via direct transfer are processed based on automatic transfer settings at the time when it is determined that the camera is capable of direct transfer and pairing is valid. Alternatively, the contents of automatic transfer settings may be obtained from the server 200b at the time of a request from the digital camera 100 for direct transfer. This makes it possible to prevent problems that could possibly occur if automatic transfer settings are changed between the search for the digital camera 100 on the LAN and the actual start of direct transfer.

Therefore, the server 200b associates image files that are received directly from the digital camera 100 with automatic transfer settings at that time, and uses the automatic transfer settings in later automatic transfer processing. On the other hand, when the PC 200a uploads the image files, it transmits, to the server 200b, the contents of automatic transfer settings that are obtained from the server 200b at the time of confirmation of the validity of pairing. In accordance with the contents of automatic transfer settings received from the PC 200a, the server 200b performs processing for automatically transferring the image files uploaded from the PC 200a to the server 200c.

In step S1304, the CPU 203 determines whether or not settings of automatic transfer to the photo storage service server 200c are valid based on the contents of settings obtained from the server 200b. If the automatic transfer settings are valid, the CPU 203 further determines in step S1305 whether or not image files received in step S605 are of a type targeted for automatic transfer.

If the automatic transfer settings are valid and the received image files are targeted for automatic transfer, the CPU 203 adds information that can identify the image files received in step S605 to a list of image files targeted for automatic transfer (an upload list) in step S1306. The information that can identify the image files may be, for example, file paths in the secondary storage apparatus 205 storing the image files. If the upload list has not been generated, the CPU 203 newly generates the upload list.

On the other hand, if the automatic transfer settings are invalid, the CPU 203 does not generate the upload list. If the automatic transfer settings are valid but the received image files are not targeted for automatic transfer, the CPU 203 does not add the information that can identify the image files received in step S605 to the upload list.

If there is no untransferred image file in the server 200b after polling the server 200b due to no discovery of a camera which is capable of direct transfer and for which pairing is valid, the PC 200a according to the present embodiment performs automatic transfer processing.

In step S1310, the CPU 203 confirms whether or not information that identifies files targeted for automatic transfer, such as file paths, is recorded by referring to the upload list. The CPU 203 returns to the process of step S601 if there is no upload list or if information that identifies the files is not described in the upload list, and proceeds to the process of step S1311 if information that identifies the files is recorded in the upload list.

The CPU 203 uploads files recorded in the upload list onto the server 200b in step S1311, and after uploading all images, returns to the process of step S601.

It should be noted that, in the present embodiment, the device search process is performed even while image files are being received from the server 200b and while image files are being automatically transferred to (uploaded onto) the server 200b, similarly to the first embodiment. If the existence of an already-paired digital camera capable of direct transfer on the network is detected, the CPU 203 interrupts the process that is being performed and proceeds to the process of step S605. The CPU 203 then receives data transmitted directly from the discovered digital camera.

If the upload of step S1311 is interrupted, the CPU 203 manages data for which the upload was interrupted midway in an untransferred state on the upload list; in this way, this data is re-uploaded in the next upload processing.

In the present embodiment also, if the existence of an already-paired digital camera capable of direct transfer on a network is detected during the processes of steps S609 and S1311, processing may proceed to step S605 after the reception or upload being performed is completed.

Figure 14:
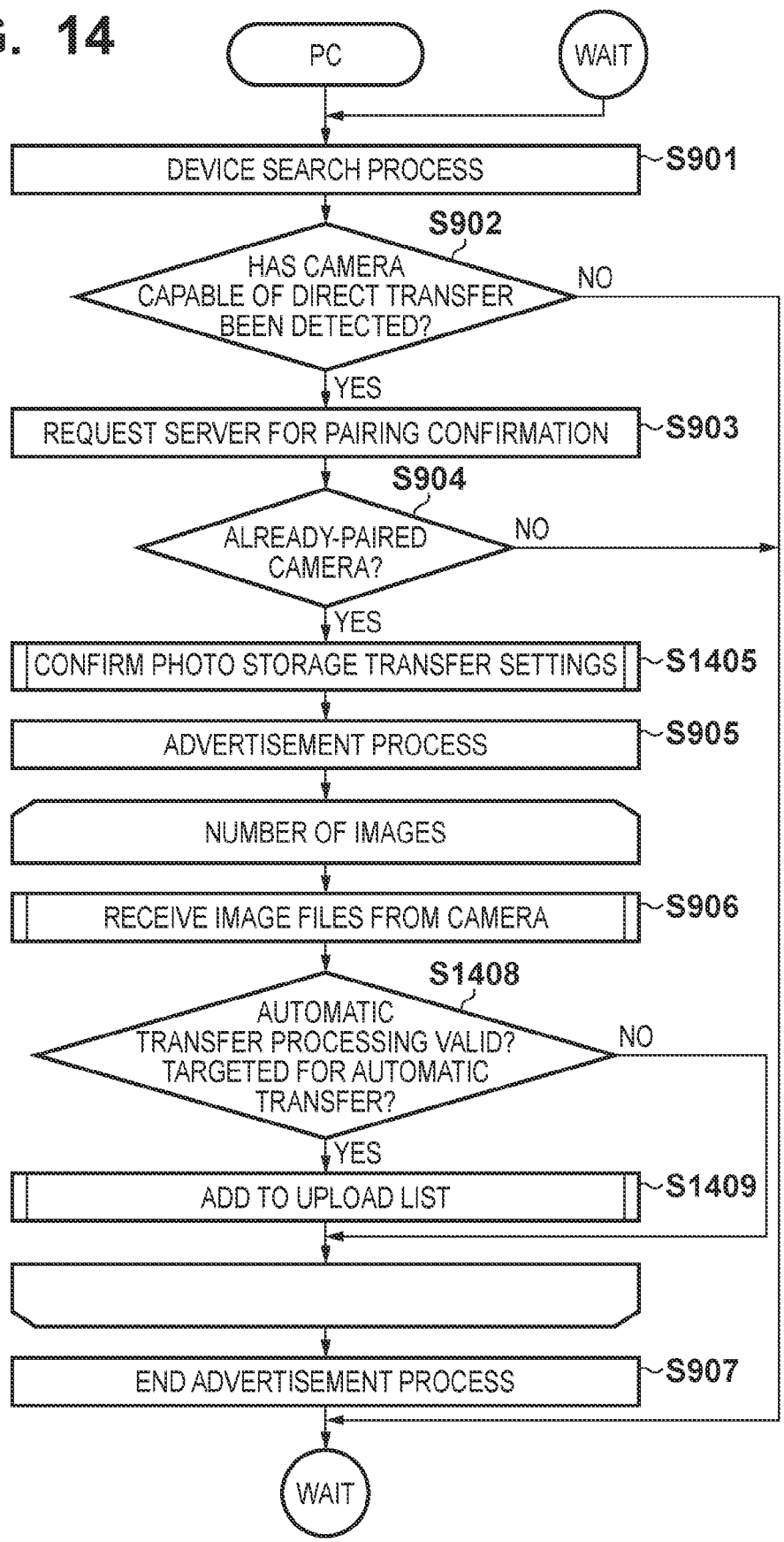
FIG. 14 is a flowchart showing a part of the processing of the PC according to the second embodiment shown in FIG. 13, more precisely, further details of steps related to processes until generation of an upload list.

FIG. 14 is a flowchart showing a part of the processing of the PC 200a according to the present embodiment shown in FIG. 13, more precisely, further details of steps related to processes until the generation of the upload list. Processes of FIG. 14 that are similar to those of FIG. 9 are given the same reference numerals thereas, and a description thereof is omitted.

If the validity of pairing of the digital camera 100 that has been discovered through the device search process and is capable of direct transfer is confirmed in the processes of steps S903 and S904, the CPU 203 obtains settings of transfer to the photo storage service server from the server 200b in step S1405.

Then, in step S1408, the CPU 203 determines whether or not automatic transfer settings are valid and the image files received in step S906 are of a type targeted for transfer by referring to the settings of transfer to the photo storage server obtained in step S1405. If both conditions are satisfied, the CPU 203 adds information that identifies the image files received in step S906 to the upload list.

Figure 15:
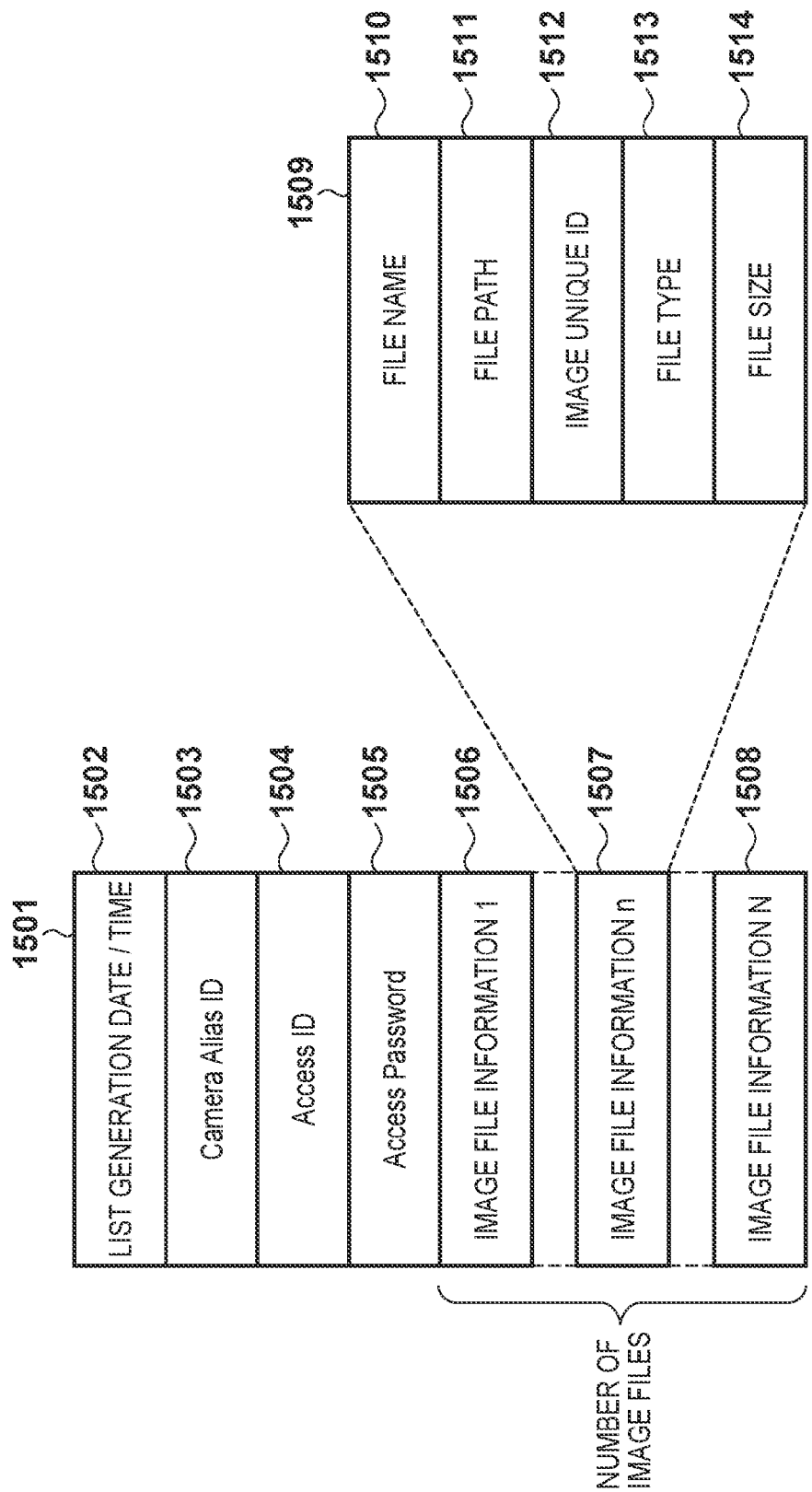
FIG. 15 shows an example of a data structure of an upload list generated by the PC according to the second embodiment.

FIG. 15 shows an example of a data structure of an upload list generated by the PC 200a in the present embodiment.

In the present embodiment, an upload list 1501 can be described as character string information using an XML and the like, or data blocks composed of binary data. Reference numerals from 1502 are data elements composing the upload list.

A list generation date/time 1502 is a timestamp of the date and time of generation of information of the list. Specifically, it indicates the time when the digital camera 100 started to transfer image files to the PC 200a (or the time in the PC 200a when reception of the image files was started).

The list generation date/time 1502 can be used in, for example, placing a temporal restriction on files to be uploaded in automatic transfer processing.

A Camera Alias ID 1503 is unique information appended by the server 200b to the digital camera 100.

An Access ID 1504 of the digital camera 100 is issued when pairing is set between the server 200b and the digital camera 100. It is an authentication ID used when the digital camera 100 communicates with the server 200b. The server 200b permits communication when the digital camera 100 uses this authentication ID. This authentication ID is also used as information that identifies the digital camera 100 serving as a transmission source.

An Access Password 1505 is also issued by the server 200b when pairing is set between the server 200b and the digital camera 100. It is an authentication password used when the digital camera 100 communicates with the server.

The server 200b can uniquely identify the digital camera 100 and perform authentication to permit access due to the data transfer application transmitting the Access ID 1504 and the Access Password 1505 to the server 200b.

Pieces of image file information 1506, 1507, 1508 identify image files targeted for automatic transfer. The number of recorded pieces of image file information is equal to the number N of files targeted for automatic transfer. In FIG. 15, reference numerals 1506, 1507, and 1508 are respectively the first image file information, the intermediate $n^{th}$ arbitrary image file information (n>1), and the last, i.e., $N^{th}$ image file information (N>n).

Each piece of image file information is an information block 1509 including a plurality of pieces of information used in uploading a corresponding image file.

A file name 1510 is used as data for storage when an image is transmitted to the server 200c.

A file path 1511 indicates a location of storage of the image file in the secondary storage apparatus 205, and is used to distinguish a location of original data when the image file is uploaded.

A unique ID 1512 of the image file holds information of a number issued by the digital camera 100 at the time of image generation, for the purpose of preventing repetitive use of the same image.

An identifier defined in accordance with a file type targeted for automatic transfer is used as a file type 1513. The file type may be an extension of the image file.

A file size 1514 is the number of bytes representing a data size at the time of upload.

The file size 1514 is also used as an index for confirming the accurate transfer of all files targeted for upload.

The contents of the information block 1509 in image file information are not limited to the example shown in FIG. 15, and may include any information used in processing for automatic transfer from the PC 200a.

FIG. 16 is a flowchart showing further details of upload processing of the PC 200a, which correspond to steps S1310 and S1311 of FIG. 13.

In step S1601, if there is an upload list, the CPU 203 reads the upload list into the primary storage apparatus 204, and proceeds to a process of step S1602. If there is no upload list, it means that automatic transfer processing is invalid or there is no image file targeted for automatic transfer, and therefore the CPU 203 ends processing.

In step S1602, the CPU 203 ends processing if image file information is not described in the upload list, and proceeds to a process of step S1603 if image file information is recorded in the upload list.

In step S1603, the CPU 203 starts loop processes that are equal in number to image files targeted for automatic transfer recorded in the upload list.

In step S1604, the CPU 203 transmits information related to image files to be uploaded onto the server 200b in order to have upload of the image files accepted, and proceeds to the process of step S1605. At this time, the CPU 203 transmits the contents of automatic transfer settings obtained from the server 200b to the server 200b.

The CPU 203 uploads the image files onto the server 200b in step S1605, and proceeds to a process of step S1606.

In step S1606, the CPU 203 deletes, from the upload list, image file information related to image files for which a notification of normal completion of reception has been received from the server 200b, and proceeds to a process of step S1607.

In step S1607, the CPU 203 ends processing upon completion of the loop until there is no image file information described in the upload list.

It should be noted that, when the image files are uploaded from the PC 200a onto the server 200b in steps S1604 and S1605, the CPU 203 uses authentication information that is used when the digital camera 100 accesses the server 200b via server-mediated transfer. This authentication information denotes the Access ID and Access Password of the digital camera 100 shown in FIGS. 4A and 4B. When the PC 200a is authenticated by the server 200b using the authentication information of the digital camera 100, the server 200b can transfer image files received via the PC 200a to the server 200c similarly to files received directly from the digital camera 100. As stated earlier, in accordance with the contents of automatic transfer settings received from the PC 200a, the server 200b performs processing for automatically transferring the image files uploaded by the PC 200a.

It should be noted that image files uploaded from the PC 200 onto the server 200b include information that enables distinction from image files transmitted from the digital camera 100 directly to the server 200b. This is for avoiding a situation in which the server 200b erroneously recognizes image files received via the PC 200 as image files received directly from the digital camera 100, and includes them into an untransferred image list. The server 200b generates the untransferred image list while excluding image files uploaded from the PC 200. This makes it possible to avoid a situation in which image files uploaded by the PC 200a are received as untransferred image files.

FIG. 17 is a flowchart showing an overview of processing in which the server 200b transfers image files to the photo storage service server 200c based on automatic transfer settings.

The CPU 203 of the server 200b generates a transfer target list with regard to image files of the digital camera 100 that have been received either directly or via the PC 200a in accordance with automatic transfer settings at the time of transmission of the image files from the digital camera 100. For example, each time the image files are received directly from the digital camera 100, the automatic transfer settings are referred to, and if transfer settings are valid and the types of the image files match the types targeted for transfer, information that identifies the image files is added to transfer target lists of respective transfer destination servers 200c. With regard to image files received from the PC 200a, the transfer target list is generated with reference to information related to a server or a service serving as a transfer destination among automatic transfer settings received from the PC 200a, because all of these image files are targeted for automatic transfer. The transfer target list is referred to at predetermined intervals, and if there are image files that are intended to be automatically transferred, the following automatic transfer processing is performed.

In step S1701, the CPU 203 of the server 200b (hereinafter simply referred to as the server 200b) identifies a photo storage service server 200c for which an automatic transfer target list exists.

In step S1703, the server 200b logs into the server 200c serving as an automatic transfer destination using authentication information set through the advanced settings shown in FIG. 12B.

In step S1705, the server 200b reads image files from the secondary storage apparatus 205 of the server 200b based on information included in the automatic transfer target list, and transfers the image files to the server 200c.

In step S1707, the server 200b ends the automatic transfer processing when transfer of all image files corresponding to information included in the automatic transfer target list is ended. If a plurality of transfer destinations are designated, similar processing is performed repeatedly in accordance with transfer target lists for the respective transfer destinations.

As described above, in the present embodiment, data can be automatically transferred via a server providing a data transfer service to an external server providing another service, and therefore a service with better usability can be provided.

In addition, as processing for automatic transfer to the external server is performed based on the settings at the time of transmission of data from a digital camera, the processing for automatic transfer can be performed in an originally intended manner even if automatic transfer settings are changed before the processing for automatic transfer is performed.

Third Embodiment

The feature of a third embodiment lies in a configuration for reliably performing processing for automatically transferring image files received by the PC 200a via direct transfer in the second embodiment. If automatic transfer processing is set to a valid state, the user may recognize that image files in the PC 200a have been automatically transferred without being aware of whether they have been transmitted to the PC 200a via direct transfer or transmitted to the PC 200a via a server. However, in practice, there is a possibility that upload from the PC 200a to the server 200b is not completed.

If the user deletes, from the PC 200a, image files for which upload from the PC 200a to the server 200b is not completed based on the recognition that they have been automatically transferred to the photo storage service server 200c, there is a possibility that problems will arise. In particular, if the image files have been deleted from the recording medium 141 of the digital camera 100, the image files could possibly be lost.

In view of this, in the present embodiment, whether or not upload of image files transferred directly to the PC 200a onto the server 200b is completed is managed, and image files for which upload is not completed are protected, or a warning is provided if a deletion instruction is issued therefor. In this way, deletion of image files before upload is prevented, and reliable automatic transfer processing is performed.

FIG. 18 shows an example of a screen displayed by the PC 200a according to the present embodiment, showing a list of image files targeted for upload and upload statuses.

This screen is generated by the CPU 203 and displayed on the display unit 201 when an instruction is issued through, for example, a button arranged in a menu and the like of a transfer service application. If upload of image files onto the server 200b is completed normally in step S1605 of FIG. 16, the CPU 203 deletes corresponding image file paths from the "upload list" in step S1606. At this time, an "upload completion list" describing the deleted image file paths is generated.

Then, the CPU 203 generates the screen of FIG. 18 by cross-referencing the "upload list" and the "upload completion list" with each other. It displays "Untransmitted" in the statuses of images for which upload is not completed, and "Transmitted" in the statuses of images for which upload is completed. The CPU 203 also displays "Unknown" for image files for which upload is not completed and which do not exist in corresponding image file paths described in the "upload list". This enables the user to be aware of information of image files for which upload is completed and information of image files for which upload is not completed, as well as image files that do not exist in file paths and thus cannot be uploaded.

In order not to produce image files with "Unknown" statuses whenever possible, the present embodiment prevents a situation in which image files described in the "upload list" can no longer be uploaded as a result of getting moved to another location or getting deleted.

Specifically, for example, in step S1308 of FIG. 13, after the CPU 203 receives images from the digital camera 100 and describes image file paths in the "upload list", it changes attribute information of image files described in the "upload list" and locks the image files. If the upload is completed normally in step S1605 of FIG. 16, the CPU 203 unlocks image files stored in the secondary storage apparatus 205.

A method of protecting image files for which upload is not completed in order to reliably perform upload from the PC 200a onto the server 200b is not limited to the method of locking image files described in the "upload list".

As one example of other methods, target image files may be monitored until the upload is completed, and a warning may be displayed if the user attempts to delete or move the target image files. If the user deletes or moves the target image files even after the warning, the "Unknown" statuses are displayed when the screen of FIG. 18 is displayed. This does not apply when image files are transmitted in step S1605 of FIG. 16.

As another method, image files may be copied in advance from a storage folder to another location, for example, a hidden folder which has been prepared in the secondary storage apparatus 205 and which is difficult for the user to operate, and paths in the hidden folder may be described in the "upload list". Upon the completion of upload, the image files are deleted from the hidden folder and the "upload list". However, in this case, paths in the original storage folder are displayed as image file paths on the screen of FIG. 18 so as not to make the user aware of the hidden folder. Therefore, image paths in the hidden folder and paths in the original storage folder are stored in association in the "upload list". For a similar reason, paths in the original storage folder are recorded also in the "upload completion list".

As still another method, image files may be monitored until the completion of upload, and if the user attempts to delete or move the image files, the image files may be copied to a hidden folder and used for later upload. In this case, file paths in the upload list are updated at the time of the copy to the hidden folder.

Also, the time and date of reception of image files from the digital camera 100 may be recorded, and a warning may be displayed at regular intervals so that upload can be performed within a prescribed number of days. For example, it is permissible to display a pop-up showing "You have 30 days until automatic upload of set images to a server expires. Please connect to the Internet to enable upload." at the time of activation of the PC 200a. By displaying a warning in this manner, the Internet connection is suggested so as to perform the upload, even in an environment where the Internet connection is not established ordinarily.

If the prescribed number of days elapses without performing the upload, information of target image file paths is deleted from the "upload list". Furthermore, protection of the image files is removed, for example, by unlocking the image files and cancelling the monitoring of the image files, or by deleting the images copied to the hidden folder. This makes it possible to prevent a reduction in the free space of the secondary storage apparatus 205, especially if images are copied to a hidden folder.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-168337 and 2013-168338, filed on Aug. 13, 2013, which are hereby incorporated by reference herein their entirety.

The invention claimed is:

1. An information processing apparatus communicable with a first device on a first network and with a second device on a second network different from the first network, the information processing apparatus comprising:

a processor:
a memory that stores instructions executable by the processor, wherein the instructions, when executed by the processor, causes the processor to function as:
a search unit configured to search for the first device on the first network;
a first reception unit configured to, if the first device has been discovered by the search unit, receive data from the first device;
a transmission unit configured to, if the data received by the first reception unit is to be transferred from the second device, upload the data onto the second device;
a confirmation unit configured to confirm whether or not the second device has data that has been transmitted from the first device to the second device and that is to be transferred to the information processing apparatus; and
a second reception unit configured to receive the data from the second device if the second device has the data,
wherein
the transmission unit determines whether or not the data received by the first reception unit is to be transferred from the second device in accordance with a predetermined setting.

2. The information processing apparatus according to claim 1, wherein
if a device having a function of transmitting data to the information processing apparatus on the first network has been discovered on the first network, the search unit queries the second device about whether or not the discovered device is associated with a user of the information processing apparatus, and considers that the first device has been discovered if the discovered device is associated with the user of the information processing apparatus.

3. The information processing apparatus according to claim 2, wherein
the predetermined setting is managed by the second device, and the search unit obtains the predetermined setting from the second device at a time of the query, and
the transmission unit makes the determination based on the predetermined setting obtained from the second device.

4. The information processing apparatus according to claim 1, wherein
the search unit performs the search even while the second reception unit is receiving the data, and if the first device is discovered while the second reception unit is receiving the data, reception by the first reception unit is prioritized over reception by the second reception unit.

5. The information processing apparatus according to claim 1, wherein
the transmission unit appends, to data to be uploaded onto the second device, information that enables distinction between data that the second device receives directly from the first device and data uploaded from the information processing apparatus.

6. A control method for an information processing apparatus communicable with a first device on a first network and with a second device on a second network different from the first network, the control method comprising:
searching for the first device on the first network;
receiving, if the first device has been discovered in the search step, data from the first device;
uploading, if the data received in the first reception step is to be transferred from the second device, the data onto the second device;
confirming whether or not the second device has data that has been transmitted from the first device to the second device and that is to be transferred to the information processing apparatus; and
receiving the data from the second device if the second device has the data,
wherein, the uploading comprises
determining, whether or not the data received in the first reception step is to be transferred from the second device in accordance with a predetermined setting.

7. A non-transitory computer-readable storage medium storing a program for causing, when executed by a computer, the computer to function as an information processing apparatus, which is communicable with a first device on a first network and with a second device on a second network different from the first network, and comprises:
a search unit configured to search for the first device on the first network;
a first reception unit configured to, if the first device has been discovered by the search unit, receive data from the first device;
a transmission unit configured to, if the data received by the first reception unit is to be transferred from the second device, upload the data onto the second device;
a confirmation unit configured to confirm whether or not the second device has data that has been transmitted from the first device to the second device and that is to be transferred to the information processing apparatus; and
a second reception unit configured to receive the data from the second device if the second device has the data,
wherein
the transmission unit determines whether or not the data received by the first reception unit is to be transferred from the second device in accordance with a predetermined setting.

8. An information processing apparatus communicable with a first device on a first network and with a second device on a second network different from the first network, the information processing apparatus comprising:
a search unit configured to search for the first device on the first network;
a first reception unit configured to, if the first device has been discovered by the search unit, receive data from the first device;
a confirmation unit configured to confirm whether or not the second device has data that has been transmitted from the first device to the second device and that is intended to be transferred to the information processing apparatus; and
a second reception unit configured to receive the data from the second device if the second device has the data,
wherein
the search unit performs the search even while the second reception unit is receiving the data, and if the first device is discovered while the second reception unit is receiving the data, reception by the first reception unit is prioritized over reception by the second reception unit.

9. The information processing apparatus according to claim 8, wherein the first device has a function of transmitting data to the information processing apparatus on the first network, and is associated with a user of the information processing apparatus.

10. The information processing apparatus according to claim 8, wherein if a device having a function of transmitting data to the information processing apparatus on the first network has been discovered on the first network, the search unit queries the second device about whether or not the discovered device is associated with a user of the information processing apparatus, and considers that the first device has been discovered if the discovered device is associated with the user of the information processing apparatus.

11. The information processing apparatus according to claim 9, further comprising a storage unit configured to store information of the first device, wherein if the information of the first device is not stored in the storage unit, the search unit does not perform the search.

12. The information processing apparatus according to claim 11, wherein if a device whose information is stored in the storage unit has been discovered on the first network, the search unit queries the second device about validity of association with the user of the information processing apparatus, and considers that the first device has been discovered if the association with the user of the information processing apparatus is valid.

13. The information processing apparatus according to any claim 8, wherein if the first device is discovered while the second reception unit is receiving the data, reception by the second reception unit is interrupted, and reception by the first reception unit is started.

14. A control method for an information processing apparatus communicable with a first device on a first network and with a second device on a second network different from the first network, the control method comprising:

searching for the first device on the first network;

first receiving, if the first device has been discovered in the search step, data from the first device;

confirming whether or not the second device includes data that has been transmitted from the first device to the second device and that is intended to be transferred to the information processing apparatus; and second receiving the data from the second device if the second device includes the data, wherein the searching is performed in parallel with the second receiving, and if the first device has been discovered while the data is being received in the second reception step, performance of the first receiving is prioritized over performance of the second receiving.

15. A non-transitory computer-readable storage medium storing_a program for causing, when executed by a computer, the computer to function as an information processing apparatus, which is communicable with a first device on a first network and with a second device on a second network different from the first network, and comprises:

a search unit configured to search for the first device on the first network;

a first reception unit configured to, if the first device has been discovered by the search unit, receive data from the first device;

a confirmation unit configured to confirm whether or not the second device has data that has been transmitted from the first device to the second device and that is intended to be transferred to the information processing apparatus; and a second reception unit configured to receive the data from the second device if the second device has the data, wherein the search unit performs the search even while the second reception unit is receiving the data, and if the first device is discovered while the second reception unit is receiving the data, reception by the first reception unit is prioritized over reception by the second reception unit.

* * * * *